US011859755B2

(12) United States Patent
Warren et al.

(10) Patent No.: US 11,859,755 B2
(45) Date of Patent: Jan. 2, 2024

(54) INTEGRAL DUAL CLEANER CAMERA DRUM SYSTEMS AND METHODS

(71) Applicant: SeeScan, Inc., San Diego, CA (US)

(72) Inventors: Alexander L. Warren, Escondido, CA (US); Michael J. Martin, San Diego, CA (US); Mark S. Olsson, La Jolla, CA (US); Steven C. Tietsworth, San Diego, CA (US); Jeffery D. Martin, Julian, CA (US)

(73) Assignee: SeeScan, Inc., San Diego, CA (US)

( * ) Notice: Subject to any disclaimer, the term of this patent is extended or adjusted under 35 U.S.C. 154(b) by 619 days.

(21) Appl. No.: 17/110,273

(22) Filed: Dec. 2, 2020

(65) Prior Publication Data
US 2021/0164601 A1 Jun. 3, 2021

Related U.S. Application Data

(60) Provisional application No. 62/943,164, filed on Dec. 3, 2019.

(51) Int. Cl.
*H02G 1/08* (2006.01)
*F16L 55/46* (2006.01)
(Continued)

(52) U.S. Cl.
CPC ............... *F16L 55/46* (2013.01); *E03F 7/00* (2013.01); *E03F 9/005* (2013.01); *F16L 55/30* (2013.01);
(Continued)

(58) Field of Classification Search
CPC ........ B65H 51/00; B65H 51/04; B65H 51/08; B65H 51/10; B65H 51/12; B65H 59/18;
(Continued)

(56) References Cited

U.S. PATENT DOCUMENTS 2,686,234 A * 8/1954 Obszarny ........... G05G 9/04785
200/437
4,038,620 A * 7/1977 Shlesinger, Jr. ..... H01H 51/287
335/207

(Continued)

FOREIGN PATENT DOCUMENTS

EP 2257746 A1 12/2010

OTHER PUBLICATIONS

International Searching Authority, "Written Opinion of the International Searching Authority" for PCT Patent Application No. PCT/US20/63164, dated Jul. 13, 2021, European Patent Office, Munich.

*Primary Examiner* — Tyrone V Hall, Jr.
(74) *Attorney, Agent, or Firm* — Steven C. Tietsworth, Esq.; Michael J. Pennington, Esq.

(57) ABSTRACT

Cable handling devices, methods and systems are provided for securing and deploying, or retracting, one or more cables or hoses into or out of a pipe or cavity allowing inspection of the pipe or cavity. The cables and/or hoses may be coupled and moved together, or decoupled enabling them to be moved independently. A hand-held device with a housing for at least partially enclosing one or more cables or hoses, at least one coupling mechanism integrally attached to the housing, and a coupling control for coupling and decoupling the one or more cables or hoses may be provided. One or more of the cables may be connected to a camera disposed at the distal end of a cable thereby facilitating inspection of the pipe or cavity. Tools such as cutting devices or a jetter may be provided at the end of the one or more cables and/or hoses.

16 Claims, 33 Drawing Sheets

(51) Int. Cl.
*F16L 55/30* (2006.01)
*E03F 9/00* (2006.01)
*E03F 7/00* (2006.01)
*F16L 101/12* (2006.01)
*F16L 101/30* (2006.01)

(52) U.S. Cl.
CPC ............ H02G 1/08 (2013.01); *E03F 2201/40* (2013.01); *F16L 2101/12* (2013.01); *F16L 2101/30* (2013.01)

(58) Field of Classification Search
CPC .......... H02G 1/08; H02G 1/081; H02G 1/083; H02G 1/085
See application file for complete search history.

(56) References Cited

U.S. PATENT DOCUMENTS

| | | | |
|---|---|---|---|
| 5,009,242 A * | 4/1991 | Prange | .................... E03F 9/002 33/739 |
| 6,073,916 A | 6/2000 | Plummer | |
| 2008/0156783 A1 * | 7/2008 | Vanden Heuvel | ... B23K 9/1336 219/137.2 |

* cited by examiner

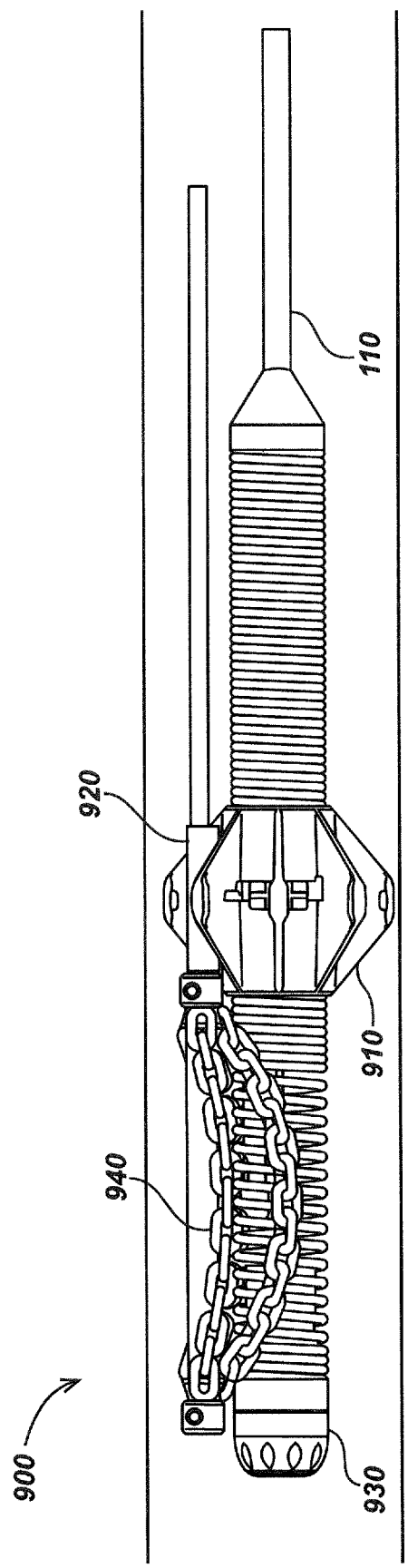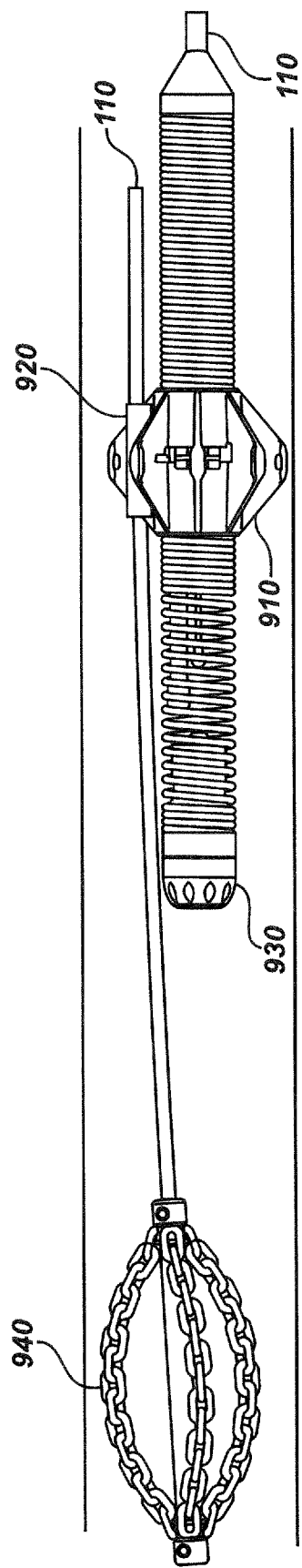

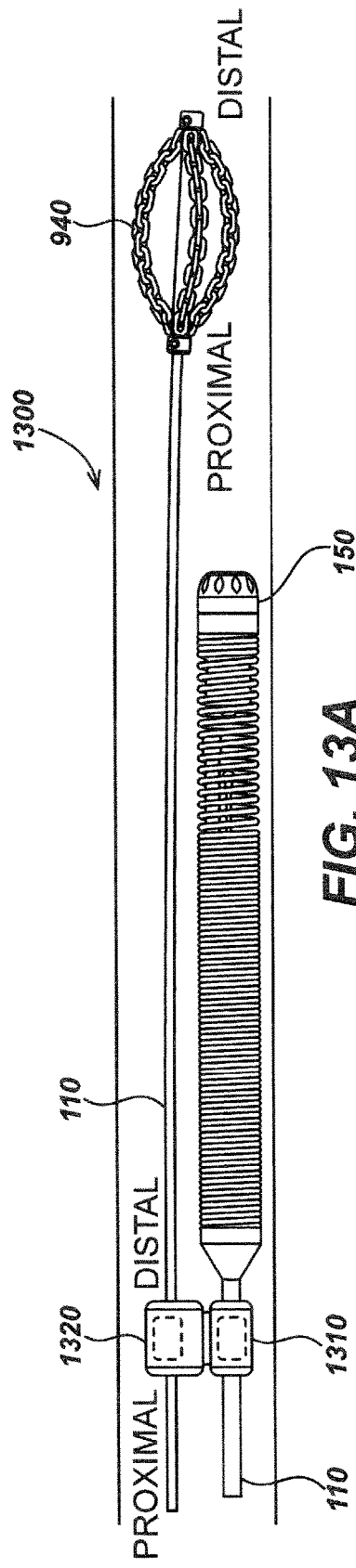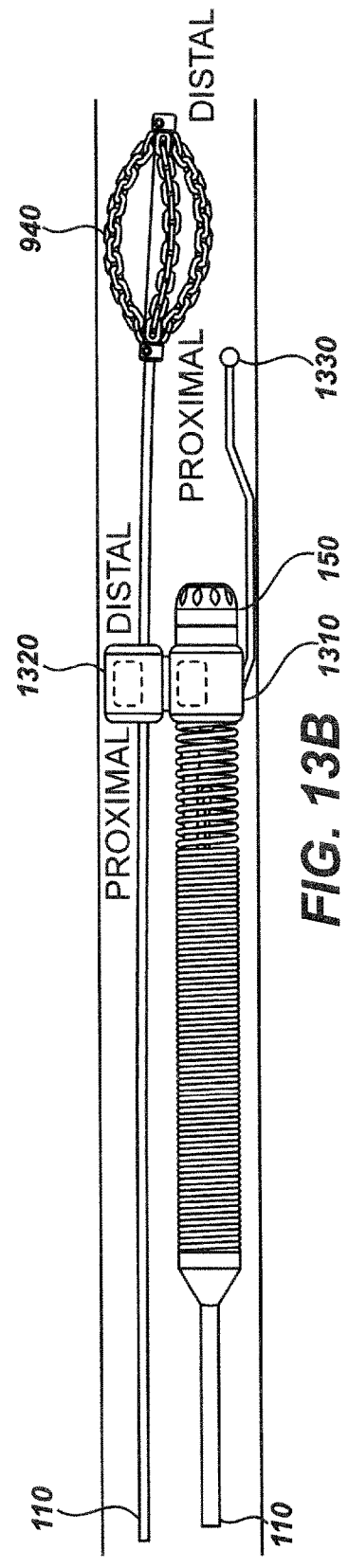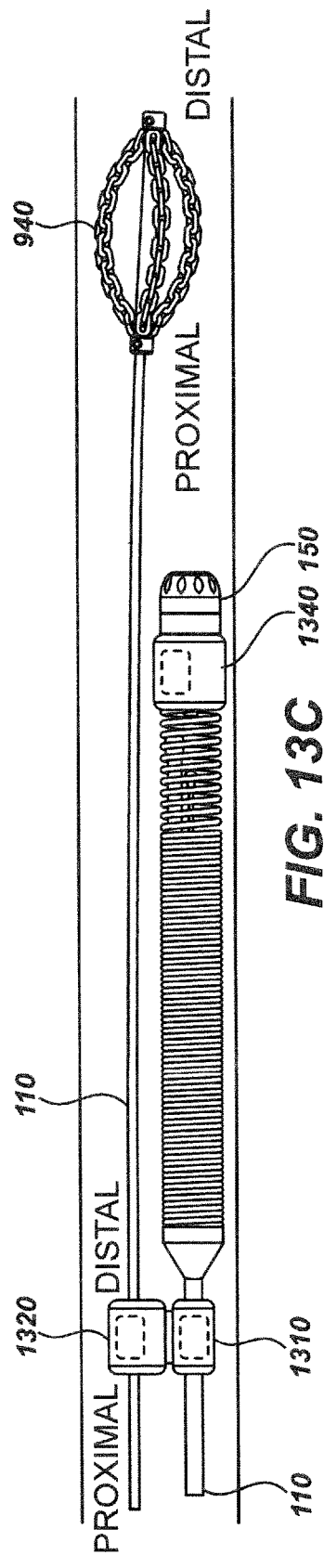

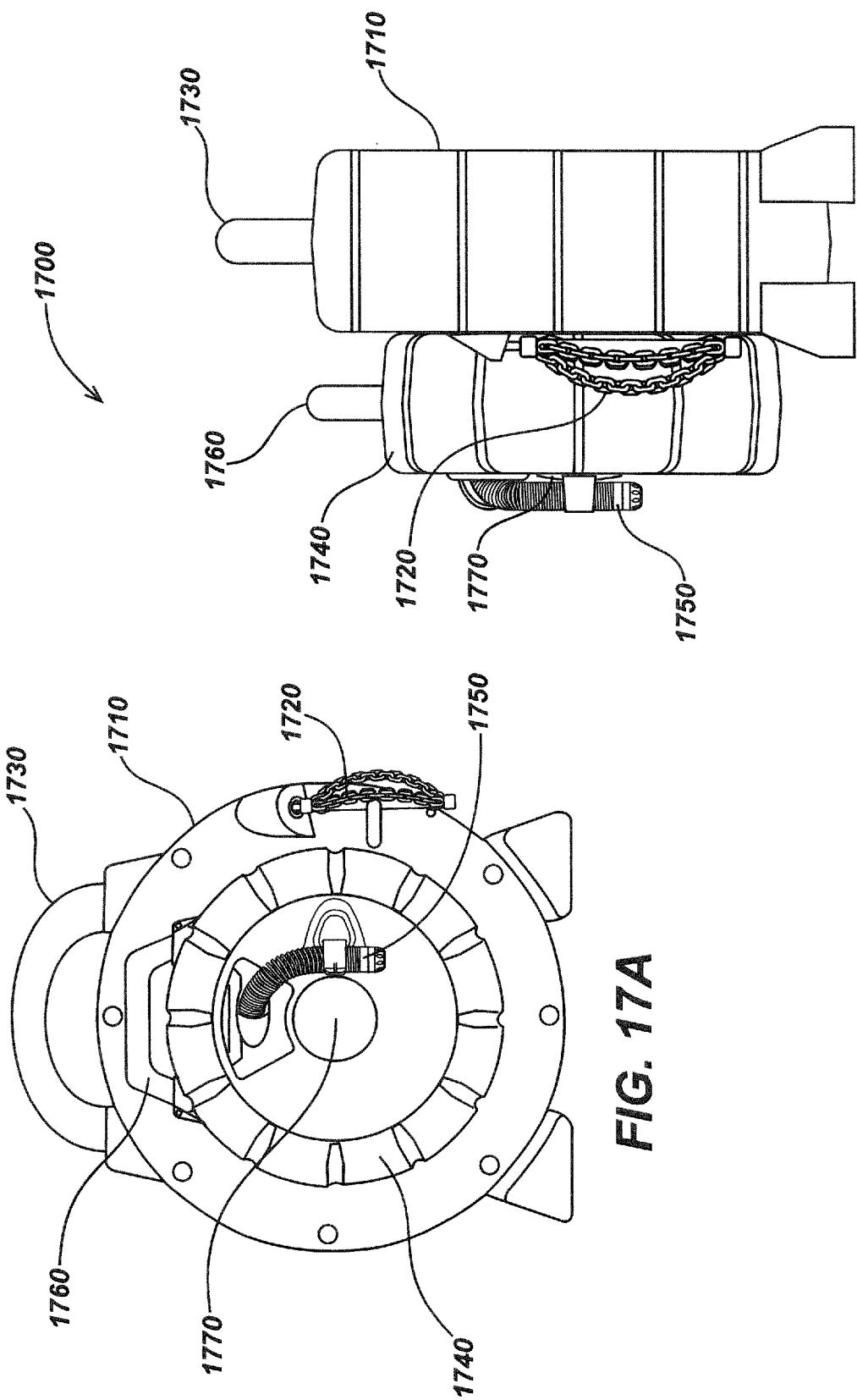

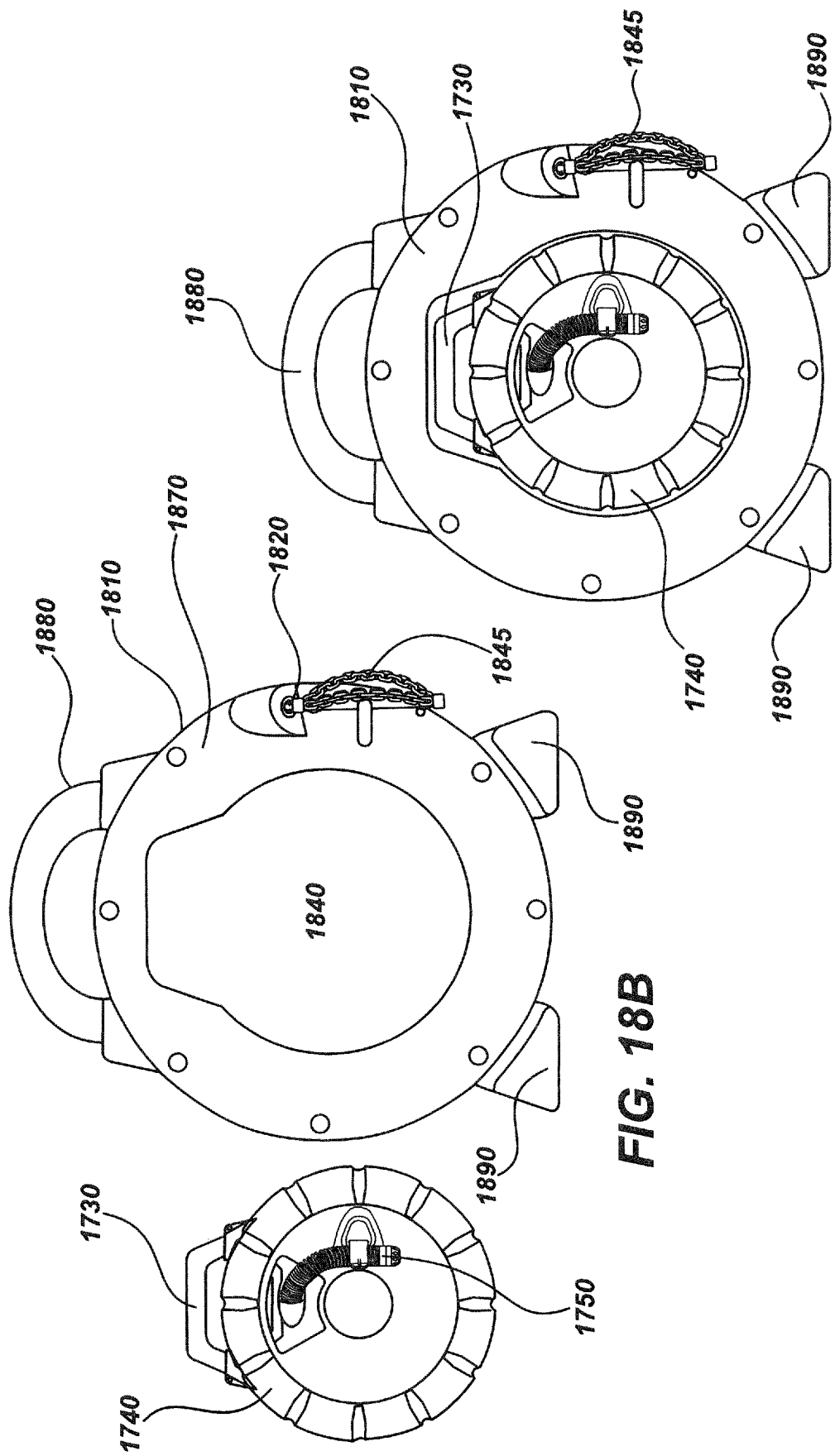

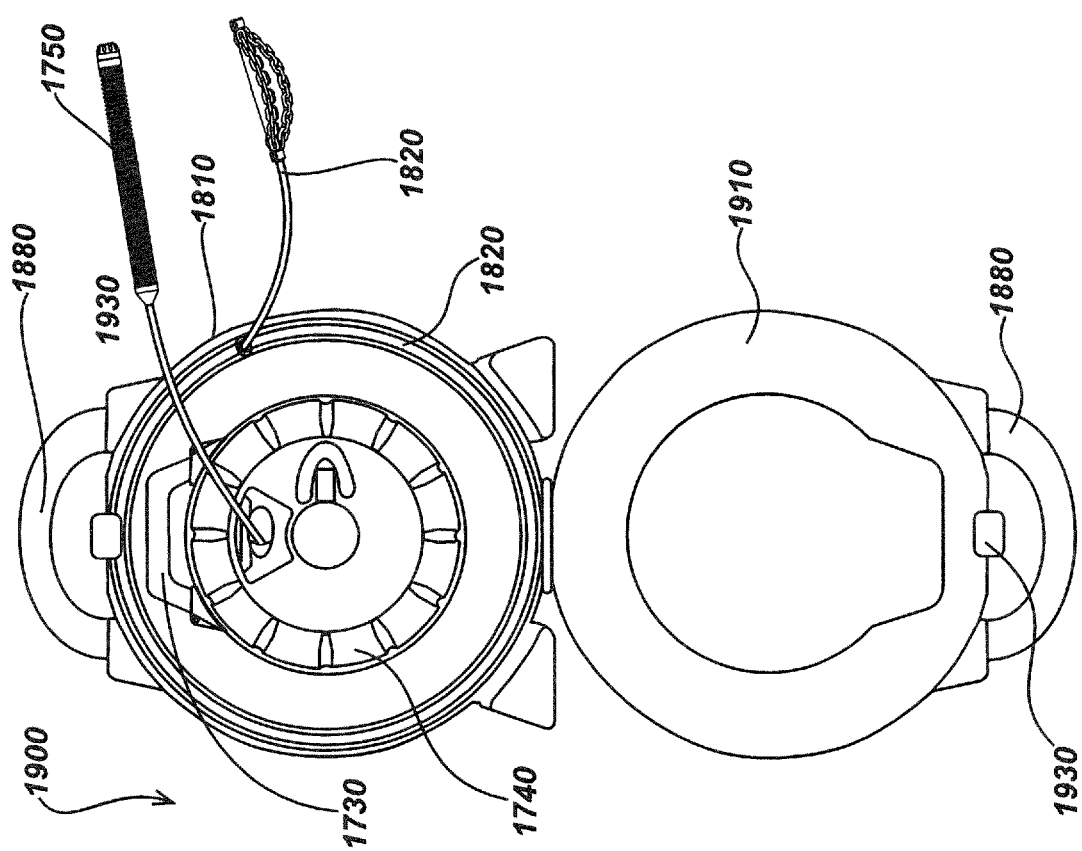
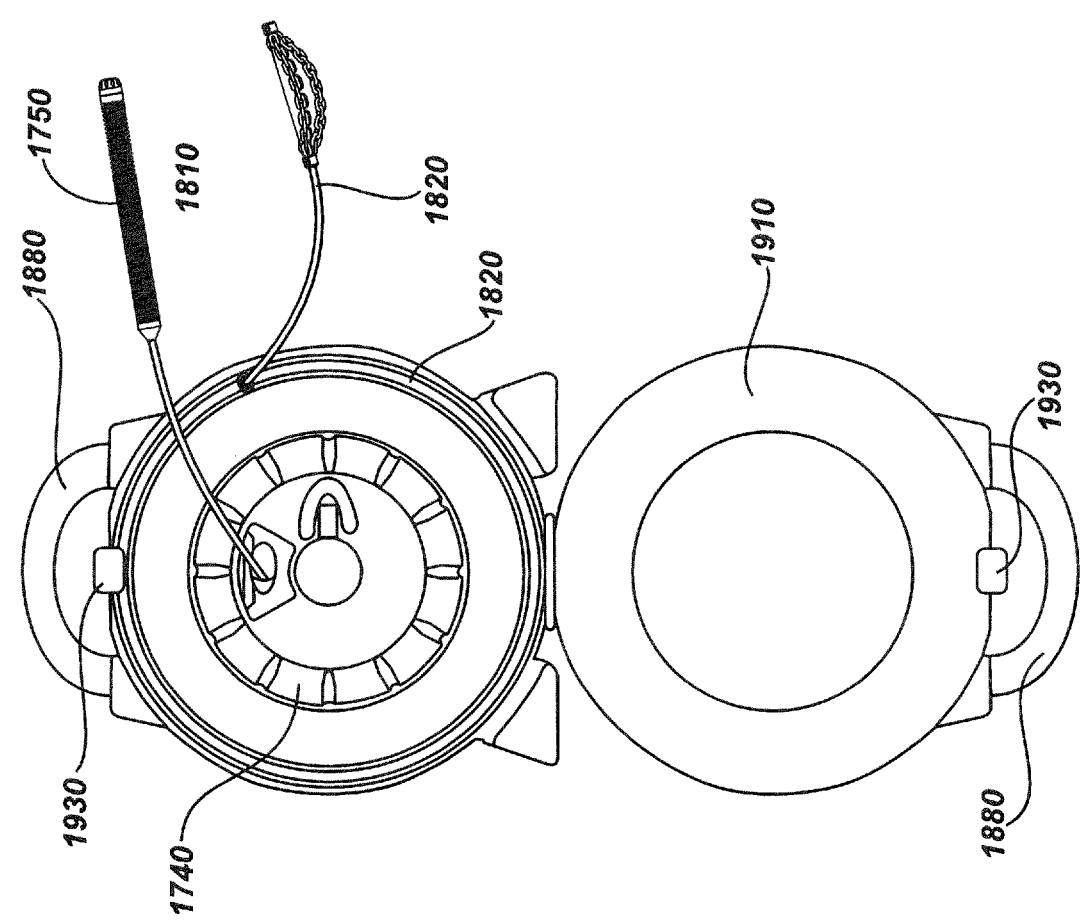
FIG. 19A
FIG. 19B

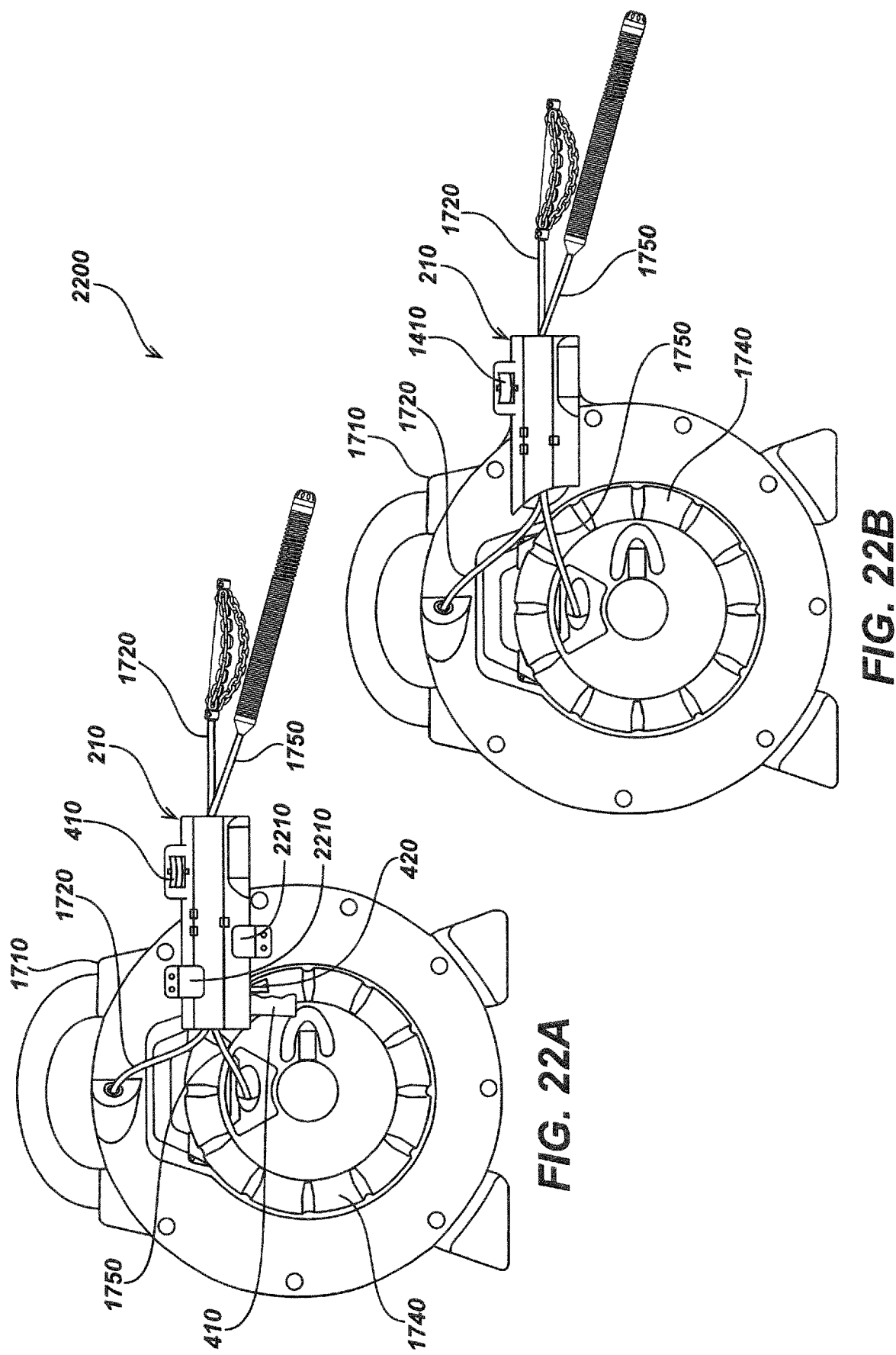

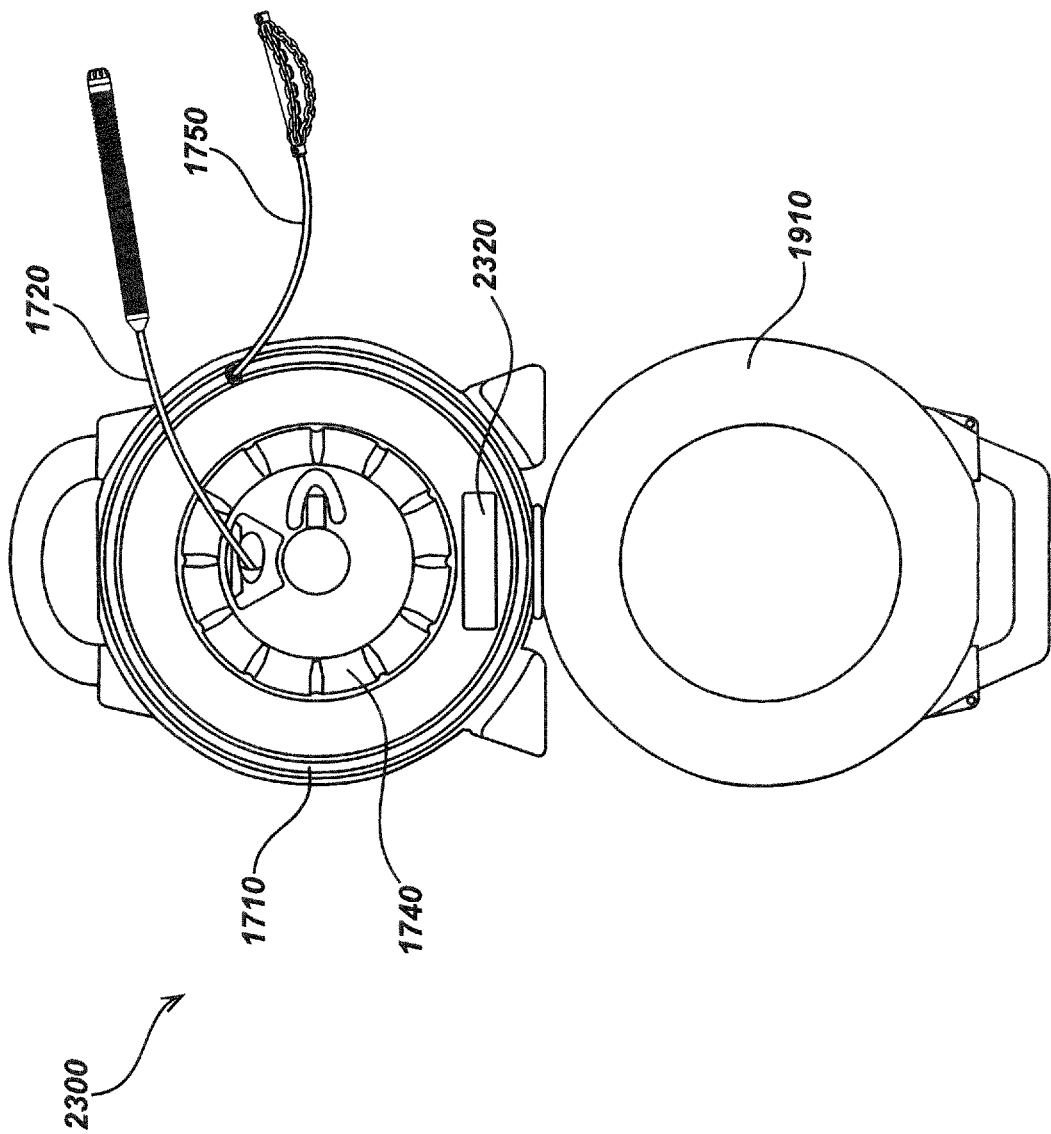

ns of the one or more cables and/or hoses to provide, among other things, cable management, cable steering and/or cable protection.

Various additional aspects, features, and functions are describe below in conjunction with the Drawings.

INTEGRAL DUAL CLEANER CAMERA DRUM SYSTEMS AND METHODS

CROSS-REFERENCE TO RELATED APPLICATIONS

This application claims priority under 35 U.S.C. § 119(e) to U.S. Provisional Patent Application Ser. No. 62/943,164, entitled INTEGRAL DUAL CLEANER CAMERA DRUM SYSTEMS AND METHODS, filed Dec. 3, 2019, the content of which is hereby incorporated by reference herein in its entirety for all purposes.

FIELD

This disclosure relates generally to pipe inspection system cable handling devices, methods, and systems. More specifically, but not exclusively, this disclosure relates to devices, methods, and systems for deploying and retracting one or more camera heads along with additional cables and/or hoses into and out of a pipe or cavity for applications such as plumbing and underground utility location video inspection and/or cleaning.

BACKGROUND

FIG. 1 illustrates a typical traditional method of deploying one or more cables or hoses into a pipe or cavity in an inspection and/or pipe cleaning operation. Typically, a user such as a plumber or utility worker deploys one or more cables or hoses by using their hands (with or without gloves depending on the application) to feed the cable or hose into a pipe or cavity by grabbing the cable or hose and pushing it in a forward direction. Then in order to retract or remove the cable or hose from the pipe or cavity, they exert a force in the opposite or backward direction by pulling the cable or hose out of the pipe or cavity. While it is possible to deploy or retract (push or pull) more than a single cable and/or hose at a time, it is often cumbersome and can be quite difficult if the cables or hoses have different dimensions, external surfaces, and/or flexibilities. Furthermore, keeping the cables and/or hoses together at the point of deployment or retraction, or at another point along the length of the cables and/or hoses inside a pipe or cavity, can be extremely difficult. Accordingly, there is a need in the art to address the above-described problems, as well as other problems, associated with handling cables or hoses for pipe or cavity inspection, cleaning, and maintenance.

SUMMARY

This disclosure relates generally to cable handling devices, methods and systems for inspection of pipes or cavities. More specifically, but not exclusively, this disclosure relates to devices, methods and systems for deploying and retracting at least one camera and additional cables and/or hoses into and out of a pipe or cavity for applications such as plumbing and underground utility location.

In another aspect, this disclosure relates to a configuration wherein the cable handling device deploys or retracts one or more cables and/or hoses by attaching various clips, clamps, and pipe guides along desired locations of the one or more cables and/or hoses to provide, among other things, cable management, cable steering and/or cable protection.

In another aspect, the disclosure relates to a configuration wherein the cable handling device works in conjunction with remotely controlled clamps dispersed along desired loca-

BRIEF DESCRIPTION OF THE DRAWINGS

FIGS. 9A, 9B, 9C, 9D and 9E are illustrations of embodiments of a pipe guide integrated with a cable/hose stop in accordance with certain aspects of the present invention.

FIGS. 13A, 13B and 13C are illustrations of embodiments using remotely controlled clamping mechanisms.

FIGS. 17A and 17B are illustrations of embodiments of a dual camera drum system in a side-by-side docked configuration.

FIGS. 18B and 18C are illustrations of embodiments of a dual camera drum system wherein a flex-shaft drum-reel is configured to allow a camera drum-reel to be docked in the center of the flex-shaft drum-reel.

FIG. 19A is an inside view illustration of an embodiment of a single case configured with a flex-shaft drum-reel on the outside with a camera drum-reel inside the center of the flex-shaft drum-reel.

FIG. 19B is an inside view illustration of an embodiment of a single case configured with a flex-shaft drum-reel on the outside which includes an opening case which allows a camera drum-reel to be docked and stored in the center of the flex-shaft drum-reel.

FIG. 22A is an illustration of an embodiment of a dual camera drum system configured with a dockable cable handling device.

FIG. 22B is an illustration of an embodiment of a dual camera drum system configured with a built-in cable handling device.

FIG. 23C is an illustration of an embodiment of a dual camera system integrated with a built in motor.

DETAILED DESCRIPTION

Overview

Figure 1:
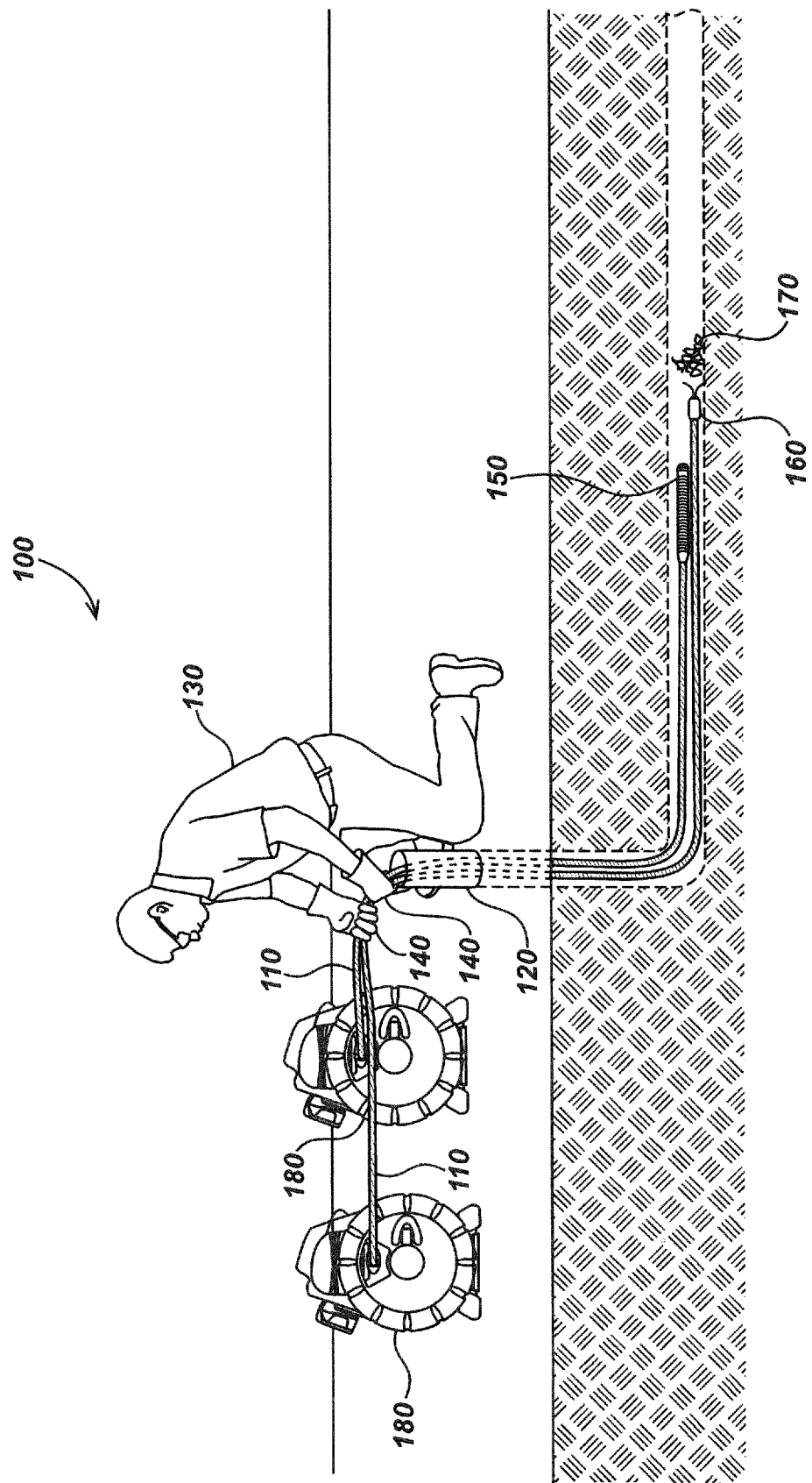
FIG. 1 is an illustration of a typical system for manually feeding one or more cables or hoses into or out of a pipe or cavity as needed for inspection, as known in the prior art.

The disclosed aspects, details, and embodiments herein may be used in various combinations with other pipe inspection, cleaning, locating, and related apparatus, systems, and methods in additional embodiments. For example, additional details and examples that may be used in conjunction with the disclosures herein are detailed in co-assigned patent applications including: U.S. Pat. No. 6,545,704, issued Apr. 7, 1999, entitled VIDEO PIPE INSPECTION DISTANCE MEASURING SYSTEM; U.S. Pat. No. 5,939,679, issued Aug. 17, 1999, entitled VIDEO PUSH CABLE; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. patent application Ser. No. 12/704,808, filed Feb. 12, 2010, entitled PIPE INSPECTION SYSTEM WITH REPLACEABLE CABLE STORAGE DRUM; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER A PAIR OF UPWARDLY OPENING POCKETS AND HELICAL COIL TYPE ELECTRICAL CORDS; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,419, issued Jun. 28, 2011, entitled PRE-AMPLIFIER AND MIXER CIRCUITRY FOR A LOCATOR ANTENNA; U.S. patent application Ser. No. 13/189,844, filed Jul. 25, 2011, entitled BURIED OBJECT LOCATOR SYSTEMS AND METHODS; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. patent application Ser. No. 13/346,668, Jan. 9, 2012, entitled PORTABLE CAMERA CONTROLLER PLATFORM FOR USE WITH PIPE INSPECTION SYSTEM; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 13/584,799, filed Aug. 13, 2012, entitled BURIED OBJECT LOCATOR SYSTEMS AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEMS AND METHODS FOR LOCATING BURIED PIPES AND CABLES WITH A MAN PORTABLE LOCATOR AND A TRANSMITTER IN A MESH NETWORK; U.S. patent application Ser. No. 13/647,310, filed Oct. 8, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/769,202, Feb. 15, 2013, entitled SMART PAINT STICK DEVICES AND METHODS; U.S. patent application Ser. No. 13/774,351, Feb. 22, 2013, entitled DOCKABLE TRIPODAL CAMERA CONTROL UNIT; U.S. patent application Ser. No. 13/787,711, Mar. 6, 2013, entitled DUAL SENSED LOCATING SYSTEMS AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, Mar. 14, 2013, entitled SYSTEMS AND METHODS INVOLVING A SMART CABLE STORAGE DRUM AND NETWORK NODE FOR TRANSMISSION OF DATA; U.S. Pat. No. 8,400,154, issued Mar. 19, 2013, entitled LOCATOR ANTENNA WITH CONDUCTIVE BOBBIN; U.S. patent application Ser. No. 13/851,951, Mar. 27, 2013, entitled DUAL ANTENNA SYSTEMS WITH VARIABLE POLARIZATION; U.S. patent application Ser. No. 13/894,038, May 14, 2013, entitled OMNI-INDUCER TRANSMITTING DEVICES AND METHODS; U.S. patent application Ser. No. 13/925,636, Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 14/027,027, Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/033,349, filed Sep. 20, 2013, entitled PIPE INSPECTION WITH SNAP ON PIPE GUIDES; U.S. Pat. No. 8,540,429, issued Sep. 24, 2013, entitled SNAP ON PIPE GUIDE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,587,648, issued Nov. 19, 2013, entitled SELF-LEVELING CAMERA HEAD; U.S. patent application Ser. No. 14/136,104, Dec. 20, 2013, entitled ROTATING CONTACT ASSEMBLIES FOR SELF-LEVELING CAMERA HEADS; U.S. patent application Ser. No. 14/148,649, Jan. 6, 2014, entitled MAPPING LOCATING SYSTEMS AND METHODS; U.S. Pat. No. 8,635,043, issued Jan. 21, 2014, entitled application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, Mar. 12, 2014, entitled ROTATING CONTACT ASSEMBLIES FOR SELF-LEVELING CAMERA HEADS; U.S. patent application Ser. No. 14/207,502, Mar. 12, 2014, entitled GRADIENT ANTENNA COILS FOR USE IN LOCATING SYSTEMS; U.S. patent application Ser. No. 14/214,151, Mar. 14, 2014, entitled DUAL ANTENNA SYSTEMS WITH VARIABLE POLARIZATION; U.S. patent application Ser. No. 14/216,358, Mar. 17, 2014, entitled SMART CABLE STORAGE DRUM AND NETWORK NODE SYSTEM AND METHODS; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 9,703,002, issued Jul. 13, 2014, entitled UTILITY LOCATOR SYSTEMS AND METHODS; U.S. patent application Ser. No. 14/446,145, Jul. 29, 2014, entitled UTILITY LOCATING SYSTEMS WITH MOBILE BASE STATION; U.S. Pat. No. 8,841,912, issued Sep. 23, 2014, entitled PRE-AMPLIFIER AND MIXER CIRCUITRY FOR A LOCATOR ANTENNA; U.S. patent application Ser. No. 14/935,878, Nov. 7, 2014, entitled INSPECTION CAMERA DEVICES AND METHODS WITH SELECTIVELY ILLUMINATED MULTISENSOR IMAGING; U.S. patent application Ser. No. 14/557,163, Dec. 1, 2014, entitled ASYMMETRIC DRAG FORCE BEARING; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER NAD OVERLAY MANAGEMENT SYSTEM; U.S. patent application Ser. No. 14/642,596, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/709,301, filed May 11, 2015, entitled PIPE MAPPING SYSTEMS AND METHODS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/746,590, Jun. 22, 2015, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/749,545, Jun. 24, 2015, entitled ADJUSTABLE VARIABLE RESOLUTION INSPECTION SYSTEMS AND METHODS; U.S. patent application Ser. No. 14/797,760, Jul. 13, 2015, entitled HAPTIC DIRECTIONAL FEEDBACK HANDLES FOR LOCATING DEVICES U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/800,490, Jul. 15, 2013, entitled UTILITY LOCATOR DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Pat. No. 9,134,255, issued Sep. 15, 2015, entitled PIPE INSPECTION SYSTEM WITH SELECTIVE IMAGE CAPTURE; U.S. patent application Ser. No. 14/949,868, Nov. 23, 2015, entitled BURIED OBJECT LOCATORS WITH DODECAHEDRAL ANTENNA NODES; U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/970,362, Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/006,119, Jan. 26, 2016, entitled SELF-STANDING MULTI-LEG ATTACHMENT DEVICES FOR USE WITH UTILITY LOCATORS; U.S. patent application Ser. No. 15/434,056, Feb. 16, 2016, entitled BURIED UTILITY MARKER DEVICES, SYSTEMS, AND METHODS; U.S. patent application Ser. No. 15/050,267, filed Feb. 22, 2016, entitled SELF-LEVELING CAMERA HEAD; U.S. Pat. No. 9,277,105, issued Mar. 1, 2016, entitled SELF-LEVELING CAMERA HEAD; U.S. Pat. No. 9,341,740, issued May 17, 2016, entitled OPTICAL GROUND TRACKING APPARATUS, SYSTEMS, AND METHODS; U.S. patent application Ser. No. 15/187,785, Jun. 21, 2016, entitled BURIED UTILITY LOCATOR GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/225,623, Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,066, issued Aug. 9, 2016, entitled SONDES AND METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. patent application Ser. No. 15/247,503, Aug. 25, 2016, entitled LOCATING DEVICES, SYSTEMS, AND METHODS USING FREQUENCY SUITES FOR UTILITY DETECTION; U.S. Pat. No. 9,927,546, issued Aug. 29, 2016, entitled PHASE SYNCHRONIZED BURIED OBJECT LOCATOR APPARATUS, SYSTEMS, AND METHODS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/264,355, Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. patent application Ser. No. 15/331,570, Oct. 21, 2016, entitled KEYED CURRENT SIGNAL UTILITY LOCATING SYSTEMS AND METHODS; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/339,766, Oct. 31, 2016, entitled GRADIENT ANTENNA COILS AND ARRAYS FOR USE IN LOCATING SYSTEMS; U.S. patent application Ser. No. 15/345,421, Nov. 7, 2016, entitled OMNI-INDUCER TRANSMITTING DEVICES AND METHODS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. patent application Ser. No. 15/360,979, Nov. 23, 2016, entitled UTILITY LOCATING SYSTEMS, DEVICES, AND METHODS USING RADIO BROADCAST SIGNALS; U.S. patent application Ser. No. 15/369,693, Dec. 5, 2016, entitled CABLE STORAGE DRUM WITH MOVABLE CCU DOCKING APPARATUS; U.S. patent application Ser. No. 15/376,576, filed Dec. 12, 2016, entitled MAGNETIC SENSING BURIED OBJECT LOCATOR INCLUDING A CAMERA; U.S. Pat. No. 9,521,303, issued Dec. 13, 2016, entitled CABLE STORAGE DRUM WITH MOVEABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. patent application Ser. No. 15/396,068, filed Dec. 30, 2016, entitled UTILITY LOCATOR TRANSMITTER APPARATUS AND METHODS; U.S. patent application Ser. No. 15/425,785, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/457,149, Mar. 13, 2017, entitled USER INTERFACES FOR UTILITY LOCATORS; U.S. patent application Ser. No. 15/457,222, Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, Mar. 13, 2017, entitled UTILITY LOCATORS WITH RETRACTABLE SUPPORT STRUCTURES AND APPLICATIONS THEREOF; U.S. patent application Ser. No. 14/022,067, Mar. 21, 2017, entitled USER INTERFACES FOR UTILITY LOCATORS; U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. patent application Ser. No. 15/470,642, Mar. 27, 2017, entitled UTILITY LOCATING APPARATUS AND SYSTEMS USING MULTIPLE ANTENNA COILS; U.S. patent application Ser. No. 15/470,713, Mar. 27, 2017, entitled UTILITY LOCATORS WITH PERSONAL COMMUNICATION DEVICE USER INTERFACES; U.S. patent application Ser. No. 15/483,924, Apr. 10, 2017, entitled SYSTEMS AND METHODS FOR DATA TRANSFER USING SELF-SYN- CHRONIZING QUADRATURE AMPLITUDE MODULATION (QAM); U.S. patent application Ser. No. 15/485,082, Apr. 11, 2017, entitled MAGNETIC UTILITY LOCATOR DEVICES AND METHODS; U.S. patent application Ser. No. 15/485,125, Apr. 11, 2017, entitled INDUCTIVE CLAMP DEVICES, SYSTEMS, AND METHODS; U.S. Pat. No. 9,625,602, issued Apr. 18, 2017, entitled SMART PERSONAL COMMUNICATION DEVICES AS USER INTERFACES; U.S. patent application Ser. No. 15/497,040, Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,632,199, issued Apr. 25, 2017, entitled INDUCTIVE CLAMP DEVICES, SYSTEMS, AND METHODS; U.S. Pat. No. 9,632,202, issued Apr. 25, 2017, entitled ECONOMICAL MAGNETIC LOCATOR APPARATUS AND METHOD; U.S. Pat. No. 9,634,878, issued Apr. 25, 2017, entitled SYSTEMS AND METHODS FOR DATA SYNCHRONIZING QUADRATURE AMPLITUDE MODULATION (QAM); U.S. Pat. No. 9,638,824, issued May 2, 2017, entitled QUAD-GRADIENT COILS FOR USE IN LOCATING SYSTEMS; U.S. patent application Ser. No. 15/590,964, May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/623,174, Jun. 14, 2017, entitled TRACKABLE DIPOLE DEVICES, METHODS, AND SYSTEMS FOR USE WITH MARKING PAINT STICKS; U.S. patent application Ser. No. 15/185,018, Jun. 17, 2016, entitled RESILIENTLY DEFORMABLE MAGNETIC FIELD TRANSMITTER CORES FOR USE WITH UTILITY LOCATING DEVICES AND SYSTEMS; U.S. patent application Ser. No. 15/626,399, Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT METHODS AND APPARATUS USING MULTIPLE ELECTROMAGNETIC SIGNALS; U.S. Pat. No. 9,696,448, issued Jul. 4, 2017, entitled GROUND-TRACKING DEVICES FOR USE WITH A MAPPING LOCATOR; U.S. patent application Ser. No. 15/670,845, Aug. 7, 2017, entitled HIGH FREQUENCY AC-POWERED DRAIN CLEANING AND INSPECTION APPARATUS AND METHODS; U.S. patent application Ser. No. 15/681,250, Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. patent application Ser. No. 15/701,247, Sep. 11, 2017, entitled PIPE INSPECTION SYSTEMS WITH SELF-GROUNDING PORTABLE CAMERA CONTROLLER; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. patent application Ser. No. 15/728,250, Oct. 9, 2017, entitled OPTICAL GROUND TRACKING APPARATUS, SYSTEMS, AND METHODS FOR USE WITH BURIED UTILITY LOCATORS; U.S. patent application Ser. No. 15/728,410, Oct. 9, 2017, entitled PIPE INSPECTION SYSTEM WITH JETTER PUSH-CABLE; U.S. Pat. No. 9,784,837, issued Oct. 10, 2017, entitled OPTICAL GROUND TRACKING APPARATUS, SYSTEMS, AND METHODS; U.S. patent application Ser. No. 15/785,330, Oct. 16, 2017, entitled SYSTEMS AND METHODS OF USING A SONDE DEVICE WITH A SECTIONAL FERRITE CORE STRUCTURE; U.S. Pat. No. 9,791,382, issued Oct. 17, 2017, entitled PIPE INSPECTION SYSTEM WITH JETTER PUSH-CABLE; U.S. Pat. No. 9,798,033, issued Oct. 24, 2017, entitled SONDE DEVICES INCLUDING A SECTIONAL FERRITE CORE; U.S. patent application Ser. No. 15/805,007, filed Nov. 6, 2017, entitled PIPE INSPECTION SYSTEM CAMERA HEADS; U.S. patent application Ser. No. 15/806,219, Nov. 7, 2017, entitled MULTI-CAMERA PIPE INSPECTION APPARATUS, SYSTEMS AND METHODS; U.S. patent application Ser. No. 15/811,264, Nov. 13, 2017, entitled SPRING ASSEMBLIES WITH VARIABLE FLEXIBILITY FOR USE WITH PUSH-CABLES AND PIPE INSPECTION SYSTEMS; U.S. patent application Ser. No. 15/811,361, Nov. 13, 2017, entitled OPTICAL GROUND TRACKING APPARATUS, SYSTEMS, AND METHODS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, Dec. 18, 2017, entitled SYSTEMS AND METHODS FOR ELECTRONICALLY MARKING, LOCATING, AND VIRTUALLY DISPLAYING BURIED UTILITIES; U.S. patent application Ser. No. 15/866,360, Jan. 9, 2018, entitled TRACKED DISTANCE MEASURING DEVICE, SYSTEMS, AND METHODS; U.S. patent application Ser. No. 15/870,787, Jan. 12, 2018, entitled MAGNETIC FIELD CANCELING AUDIO SPEAKERS FOR USE WITH BURIED UTILITY LOCATORS OR OTHER DEVICES; U.S. Provisional Patent Application 62/620,959, Jan. 23, 2018, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; patent application Ser. No. 15/889,067, Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. patent application Ser. No. 15/919,077, Mar. 12, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, Mar. 15, 2018, entitled SELF-LEVELING INSPECTION SYSTEMS AND METHODS; U.S. patent application Ser. No. 15/925,643, Mar. 19, 2018, entitled PHASE-SYNCHRONIZED BURIED OBJECT TRANSMITTER AND LOCATOR METHODS AND APPARATUS; U.S. patent application Ser. No. 15/925,671, Mar. 19, 2018, entitled MULTI-FREQUENCY LOCATING SYSTEMS AND METHODS; U.S. Pat. No.

9,924,139, issued Mar. 20, 2018, entitled PORTABLE PIPE INSPECTION SYSTEMS AND APPARATUS; U.S. patent application Ser. No. 15/936,250, Mar. 26, 2018, entitled GROUND TRACKING APPARATUS, SYSTEMS, AND METHODS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEM AND METHODS; U.S. Pat. No. 9,928,613, issued Mar. 27, 2018, entitled GROUND TRACKING APPARATUS, SYSTEMS, AND METHODS; U.S. Provisional Patent Application 62/656,259, Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. patent application Ser. No. 15/960,340, Apr. 23, 2018, entitled METHODS AND SYSTEMS FOR GENERATING INTERACTIVE MAPPING DISPLAYS IN CONJUNCTION WITH USER INTERFACE DEVICES; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Provisional Patent Application 62/686,589, filed Jun. 18, 2018, entitled MULTI-DIELECTRIC COAXIAL PUSH-CABLES; U.S. Provisional Patent Application 62/688,259, filed Jun. 21, 2018, entitled ACTIVE MARKER DEVICES FOR UNDERGROUND USE; U.S. Provisional Patent Application 62/726,500, filed Sep. 4, 2018, entitled VIDEO PIPE INSPECTION SYSTEMS, DEVICES, AND METHODS INTEGRATED WITH NON-VIDEO DATA RECORDING AND COMMUNICATION FUNCTIONALITY; U.S. patent application Ser. No. 16/144,878, filed Sep. 27, 2018, entitled MULTIFUNCTION BURIED UTILITY LOCATING CLIPS; U.S. patent application Ser. No. 16/178,494, filed Nov. 1, 2018, entitled THREE-AXIS MEASUREMENT MODULES AND SENSING METHODS; U.S. Provisional Patent Application 62/756,538, filed Nov. 6, 2018, entitled ROBUST AND LOW COST IMPEDANCE CONTROLLED SLIP RINGS; U.S. Provisional Patent Application 62/768,760, filed Nov. 16, 2018, entitled PIPE INSPECTION AND/OR MAPPING CAMERA HEADS, SYSTEMS, AND METHODS; U.S. Provisional Patent Application 62/777,045, filed Dec. 7, 2018, entitled MAP GENERATION BASED ON UTILITY LINE POSITION AND ORIENTATION ESTIMATES; U.S. Provisional Patent Application 62/794,863, filed Jan. 21, 2019, entitled HEAT EXTRACTION ARCHITECTURE FOR COMPACT VIDEO HEADS; U.S. Provisional Patent Application 62/824,937, filed Mar. 27, 2019, entitled LOW COST AND HIGH PERFORMANCE SIGNAL PROCESSING IN A BURIED OBJECT LOCATOR SYSTEM; and U.S. patent application Ser. No. 16/382,136, filed Apr. 11, 2019, entitled GEOGRAPHIC MAP UPDATING METHODS AND SYSTEMS. The content of each of the above-described patents and patent applications is incorporated by reference herein in its entirety. The above applications may be collectively denoted herein as the "co-assigned applications" or "incorporated applications."

In one aspect this disclosure relates to cable handling device for inspection of pipes or cavities. The cable handling device may include a housing for at least partially enclosing one or more cables or hoses at least one coupling mechanism integrally attached to the housing, and a coupling control for coupling and decoupling the one or more cables or hoses. The cable handling device allows a user to deploy and/or retract one or more cables and/or hoses. The cable handling device may be used to deploy various tools into a pipe or cavity for inspection and/or cleaning. For instance, in some embodiments a cable may be attached to a camera assembly and the camera may be deployed into a pipe or cavity to provide images to a user display so that a user can inspect the inside of the pipe and/or cavity.

In some embodiments a user may also deploy a flex-shaft. A flex-shaft is an elongate mechanical apparatus with a hollow flexible outer structure and an inner rotating element for transmitting power. A common example is a speedometer cable or a rotary tool cable such as provided with Dremel tools. A flex-shaft provides a flexible shaft that allows rotational power to be supplied at one end and transmitted to a rotationally operated mechanism at the other end. In the plumbing context a flex shaft may be used to transmit power to a cutting mechanism inserted into a pipe or cavity, although it has other uses such as in plumbers' snakes, hand or motor powered energy transmission, and the like. One exemplary plumbing flex shaft is sold by Ridge Tool as a Ridgid™ FlexShaft™ device.

In some embodiments, the cutting mechanism may be a blade, a cutting string, a chain knocker, or another cutting device known on the art. In some embodiments the user may deploy a hose attached to a nozzle or jetter to supply pressurized water or other fluid through the nozzle or jetter. The cable handling device allows a user to deploy and/or retract multiple cables at once more quickly and conveniently than by just using their hands. The cable handling device keeps one or more cables and/or hoses together inside the cable handling device making the one or more cables and/or hoses easier to manage. In some embodiments a user simply inserts one or more cables into the cable handling device either by threading the one or more cables or hoses through the device, or in some embodiments, by opening a hinged door and inserting the one or more cables and/or hoses.

A coupling mechanism such as one or more triggers, levers, or other controls may be provided to allow a user to clamp the one or more cables and/or hoses inside the cable handling device allowing the cables/hoses to be deployed or retracted from a pipe or cavity together. Once the user has reached the desired location in the pipe or cavity, which can be determined by viewing images provided by the camera, using a location device such as a GPS coupled to the camera, measuring the distance length of the one or more cables and/or hoses deployed, or using other location determining devices or methods understood by those skilled in the art, the user can then release the one or more triggers or controls to allow one or more of the cables and/or hoses to move independently from the cable handling device and/or the other of the one or more cables and/or hoses. This allows a user to deploy the one or more cables and/or hoses at different locations inside the pipe and/or cavity.

In one embodiment, a user inserts a cable attached to a camera and a flex-shaft attached to a cutting mechanism into the cable handling device. The user then deploys the two cables simultaneously into a pipe or cavity by using a trigger to couple the two cables and then using their hands attached to the cable handling device and pushing the device and thus the cables into the pipe. The cable handling device may also be configured to automatically deploy one or more cables and/or hoses when the trigger is activated using a motorized feeding element which may include wheels. The user may desire to have one of the cables deployed ahead of the other and, therefore, insert the cables into the cable handling device in the desired configuration. For instance, the user may want the camera to be ahead of the cutting device and may insert the cables into the cable handling device in such a way as to achieve the desired configuration. In this manner, the user can view the camera images without the cutting device obstructing the user's view. If more of the cables needs to be deployed, the user release the trigger and pulls the cable handling device back independent of the two cables. The user can repeat the sequence until the desired location inside the pipe has been reached. Once the two cables are deployed, the user may desire to pull the camera back and push the cutting device forward to allow an obstruction to be removed by the cutting device while protecting the camera cable and camera from being damaged by the cutting device. By releasing the one or more triggers, the user can move the cables independently from each other and from the cable handling device. The user may then continue the process by reconfiguring the cables inside the cable handling device as desired, and further deploying the cables into the pipe by using the trigger to inspect other locations in the pipe. When the user is done with the cables/tools inside the pipe, the trigger is activated to clamp the cables and the user manually pulls back on the cable handling device thus pulling the cables back with it. Then the trigger is released allowing the device to be pushed forward independent of the cables so that the trigger can be used again to clamp the cables and the user can continue to retract the cables as desired.

In some embodiments the device may have an automatic feeder direction control allowing the cable to be retracted.

In some embodiments, dampening or noise cancellation could be provided to reduce noise and vibration when the flex-shaft is transmitting power to a cutting mechanism in order to provide better imaging by reducing possible distortions created by the camera being near the flex-shaft.

In some embodiments, coupling mechanism may be a trigger or other control and may include other controls such as speed control, control lock, direction control, etc. A trigger may be provided to control one or multiple cables, or multiple triggers may be provided to control one or more cables individually.

In another embodiment, the cable handling device deploys or retracts one or more cables and/or hoses by attaching various clips, clamps, and pipe guides along desired locations of the one or more cables and/or hoses to provide, among other things, cable management, cable steering and/or cable protection. As an example, a pipe guide may have an opening through the center allowing the camera cable and cable to be inserted snugly into the opening. Another cable or hose, for example a flex-shaft with a cutting mechanism attached, can be inserted into one of the outside channels. The pipe guide can be attached at the desired location along the cables, or along the camera assembly, depending on the size of pipe guide used. Cable clips and clamps simply clamp one or more cables together, typically by twisting or with a provided tightening mechanism. It is often desirable to locate the clamp or pipe guide near or on the camera assembly to allow the camera and any other attached cables or hoses to be easily pushed and guided into a pipe or cavity. Guides have the added advantage over clips or clamps because they are often designed to permit axial movement while restraining both lateral and angular movement.

In another embodiment, a cutting mechanism, as an example, a chain knocker is provided a the end of a flex-shaft. The flex-shaft attaches using a pair of set screws that bite on the flexible shaft. The chain mount may have a shaft collar that is a larger diameter than the sheathing on the flexible shaft.

In another embodiment, the plastic material forming the pipe guide could be shaped and formed in such a way that it creates a flexure, so that the flex-shaft sheath can be "snapped in," but the chain mount would still crash on an undersized bore. This would allow the flex-shaft to be attached without removing the chain if the chain knocker.

In some embodiments, multiple bores could be added to allow two or more flex-shafts to be used. Alternatively, the bores could be of a different size and include a lip configured to accept an installed captive sleeve to provided adaptation to various sizes of sheathing, hose, etc. Cleaning could be provided as well, by implementing a capture O-ring in the supplemental bore, to wipe the flex-shaft sheathing pulled back into the O-ring.

In another embodiment, the disclosure relates to a configuration wherein the cable handling device works in conjunction with remotely controlled clamps dispersed along desired locations of the one or more cables and/or hoses to provide, among other things, cable management, cable steering and/or cable protection.

In another embodiment, a camera and a flex cable with a chain knocker attached at the end may be clamped together with a remote controlled clamp being placed behind the camera assembly as shown in FIG. 13A. The chain knocker could be positioned behind the camera assembly so that when the camera is moved forward or backwards in a pipe or cavity, the flex-shaft and chain knocker would be moved as well. Once a desired location is reached, LEDs located in the camera head could be modulated to send an optical signal to a receiving sensor located in the clamp, to unclamp the flex-shaft allowing it to be move independent of the camera. The flex-shaft and chain knocker could then be moved forward to allow the flex-shaft to be powered and the chain knocker to rotate to clear any obstructions without damaging the camera which is now behind the chain knocker. The clamp could then be sent another optical signal to again clamp the flex-shaft to the camera cable so the flex-shaft and chain knocker could again be deployed or retracted as desired.

In another embodiment, the remote controlled clamp could be located on or near the camera head as shown in FIG. 13B. The diameter of the distal side of the clamp could be smaller than the diameter of the chain proximal side end cap, thereby preventing the chain knocker from ever being pulled near the camera cable, thus preventing damage to the camera cable from the chain knocker.

In another embodiment, as an alternative to optically controlling the remote controlled clamp, a transmitter/transceiver could be provided on or near the camera head as shown in FIG. 13C. The transmitter/transceiver could be configured to send control signals to a receiving sensor in the clamp. The transmitted signals could be wireless, electromagnetic, radio, Bluetooth, BLE (Bluetooth Low Energy), etc. Various frequency schemes could be provided, included but not limited to, 400 Hz, 512 Hz, 32 kHz.

In another embodiment, the transmitted signal to control the remote clamp could be provided by an electromagnetic Sonde or other type of location Sonde or beacon. Alternatively, the remote controlled clamp could be integrated with a three-axis magnetometer capable of communicating with a second sensor located with the camera, wherein the second sensor is configured to modulate an electromagnetic signal that can be received by the three-axis magnetometer and used to control the opening and closing of the remote controlled clamp.

In another embodiment, a cable handling device including a coupling mechanism and a motorized feeder, may include a rocker switch configured to control the direction (forward or backward), and speed of one or more cables or hoses, either simultaneously or individually, as they are deployed or retracted during pipe cleaning or inspection. In one embodiment, the rocker switch may configured as a dual side-by-side rocker switch which can be controlled by hand, wherein each one of the dual switches controls the individual feeding direction of a cable or hose depending on if the individual switches are put into the forward, reverse, or neutral direction, and controls the speed of feeding the cable or hose depending on how far forward or reverse the switches are relative to the neutral position. In another embodiment, the rocker switch may be a single rocker switch, wherein the switch is configured to have seven positions, wherein the switch can be put completely or partially into any of six positions in order to control the direction and/or speed of feeding of one and/or two cables and/or hoses.

In another embodiment, a dual drum-reel management system allows a user to transport and/or use two drum-reels at a time using only one hand. Two-drum reels can be coupled together in a side-by-side configuration. Cables and/or hoses for inspecting and/or cleaning pipes or cavities are typically stored and deployed from a rotating drum-reel which may include a handle for carrying/transporting the drum-reel. Users, which may be plumbers or utility workers, often need to carry specific equipment for inspecting and/or cleaning pipes or cavities.

As an example, this equipment may include a flex-shaft cable for providing rotating power to a rotating tool and a camera cable connected to a camera for providing images and/or video for performing inspections and cleaning of the pipes and/or cavities. The flex-shaft cable is typically stored and deployed from a first drum-reel and the camera cable is typically stored and deployed from a second drum-reel. If a user needs to carry and/or transport both drum-reels at once, two hands are required, one for each-drum reel. Often other tools will be carried by a user by hand which creates a "not enough hands" situation if both hands are already occupied carrying the two drum-reels. Users may also use high pressure jetter hoses which can be stored and deployed from a drum-reel, as well as other equipment that may be stored and/deployed from a drum-reel, e.g. electrical cables. In some embodiments, the drum-reel may include feet to stabilize it in certain positions. The drum-reel may also include one or more wheels to allow it to be easily moved to/from a desired location.

In another embodiment, a first smaller diameter drum-reel can be docked inside a second larger diameter drum-reel, thereby allowing a user to carry both drum-reels using a single handle. The first drum-reel may be configured to remain docked inside the second drum-reel, may be configured to be removed for maintenance or replacement, or may be configured to be docked or undocked as desired.

In some embodiments, a door may be provided for each drum-reel case, and in other embodiments the second larger drum-reel case may have a door that closes over both the first and second drum-reels. In this configuration the first smaller drum-reel case can be configured with or without a door.

In another embodiment, a cable handling device configured to deploy or retract one or more cables and/or hoses may be attached to a drum-reel. The cable handling device may be configured attached to a drum-reel in a fixed position (FIG. 22B), or configured to be docked with a coupling mechanism that allows the cable handling device to be attached or removed from the drum-reel as needed (FIG. 22A).

In some embodiments, a cleaning element can be attached to one or both drum-reels, thereby allowing one or more cables and or hoses to be cleaned as they are being deployed or retracted on and off the drum reel or reels.

Figure 23B:
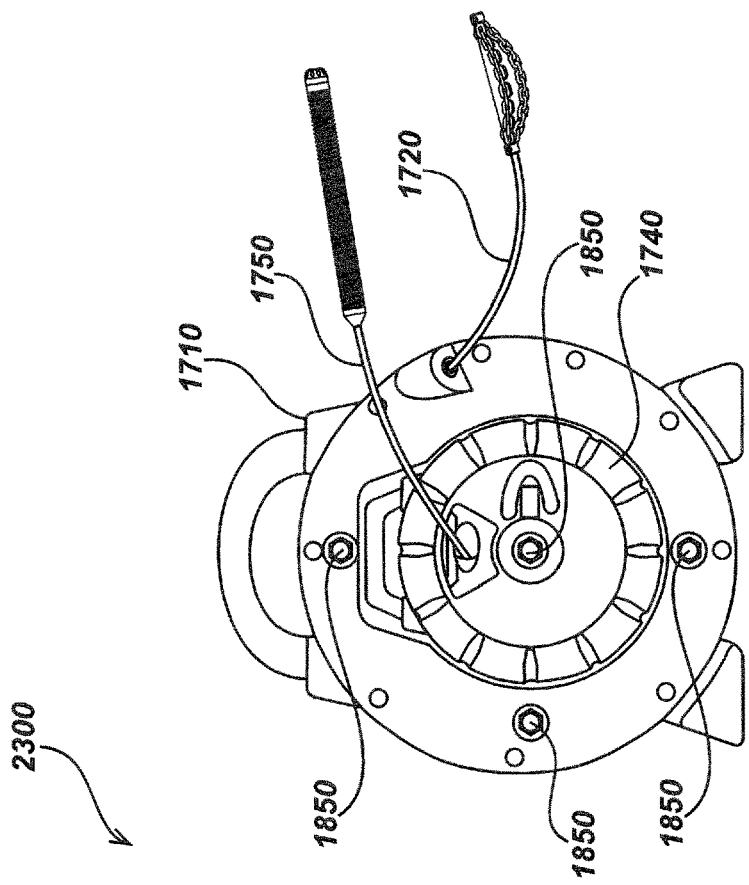
FIG. 23B is an illustration of an embodiment of a dual camera system showing possible drive shaft locations/configurations.

In one embodiment, a drum for a flex-shaft cable may include a drive shaft centered in the center of the drum-reel. The drive-shaft is accessible on the outside of the drum-reel, or if provided on the outside of the case of the drum reel, thereby allowing rotating power to be coupled to the drive shaft. When supplied with rotational power, the power will be transferred from the drive shaft to the flex-shaft cable via one or more gears. In other embodiments, there maybe one or more drive shafts which may be configured on different locations, as desired. By way of example only, examples are shown in FIG. 23B.

Figure 23A:
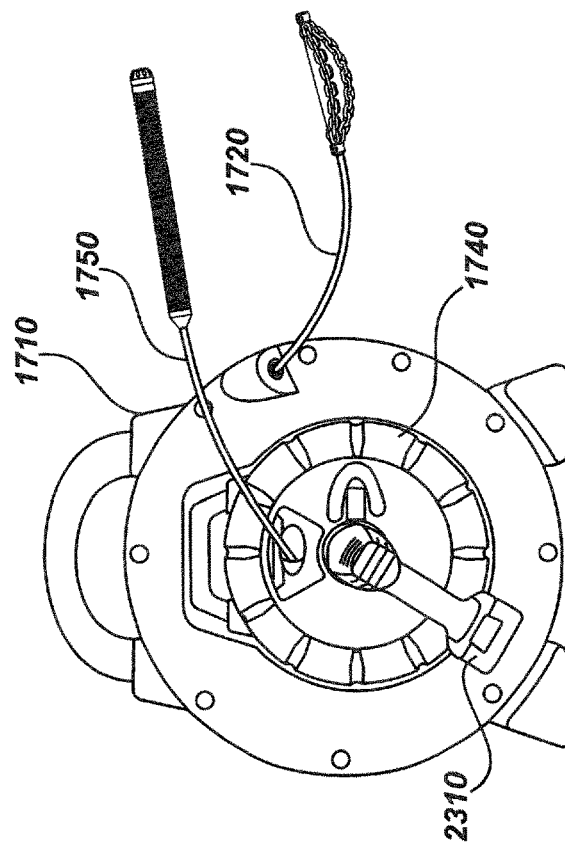
FIG. 23A is an illustration of an embodiment of a dual camera system integrated with a typical hand-drill in a standard configuration, as known in the prior art.

In one embodiment, rotational power for a flex-shaft cable may be provided by an external motor, as an example, a motorized drill as shown in FIG. 23A. In another embodiment, power may be provided by a motor integrated with the drum-reel, as shown in FIG. 23C.

Figures 20A, 20B:
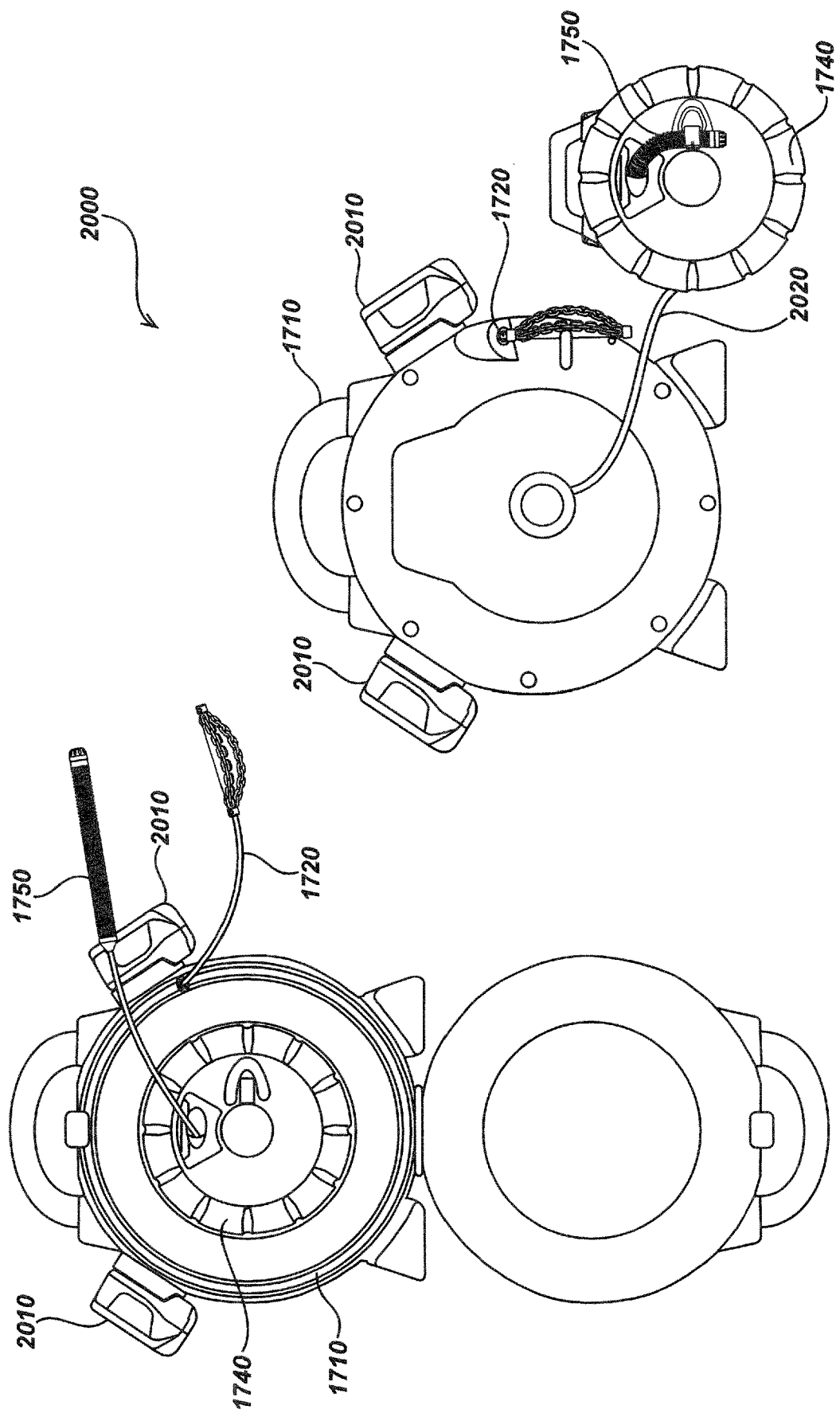
FIGS. 20A and 20B are illustrations of embodiments of a dual camera drum system integrated with at least one battery.

In one embodiment, one or more batteries may be removably attached to a drum-reel or a drum-reel case, as shown in FIGS. 20A and 20B. The one or more batteries may provide power to a motor, a camera, or any other equipment requiring battery power.

In another embodiment, a drive-shaft may be provide for supplying rotational power to one or more gears internal to a drum-reel, wherein the one or more gears rotate, the drum-reel rotates, thereby allowing a cable and/or hose to be stored on (wound) or deployed from (unwound) the drum-reel.

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

FIG. 1 is an example of a typical system 100 which may be used for deploying or retracting one or more cables and/or hoses 110 into a pipe or cavity 120, manually by user 130 by hand 140. The one or more of the cables and/or hoses 110 may be a cable 110 attached to a camera assembly 150, and one or more of the cables and/or hoses 110 may be a flex-shaft 110 for providing power to a cutting tool 160, which may be used to clear an obstruction 170 in the pipe or cavity 120. Optionally, one or more of the cables and/or hoses 110 may be a hose 110 which provides pressurized water or other fluid through a nozzle or jetter (not shown). The cutting tool 160 and/or pressurized water or other fluid forced through the nozzle or jetter (not shown) may be used to clear an obstruction 170 in the pipe or cavity 120. Optionally, one or more cables and/or hoses may be deployed from and stored on drum-reels 180.

Figure 2:
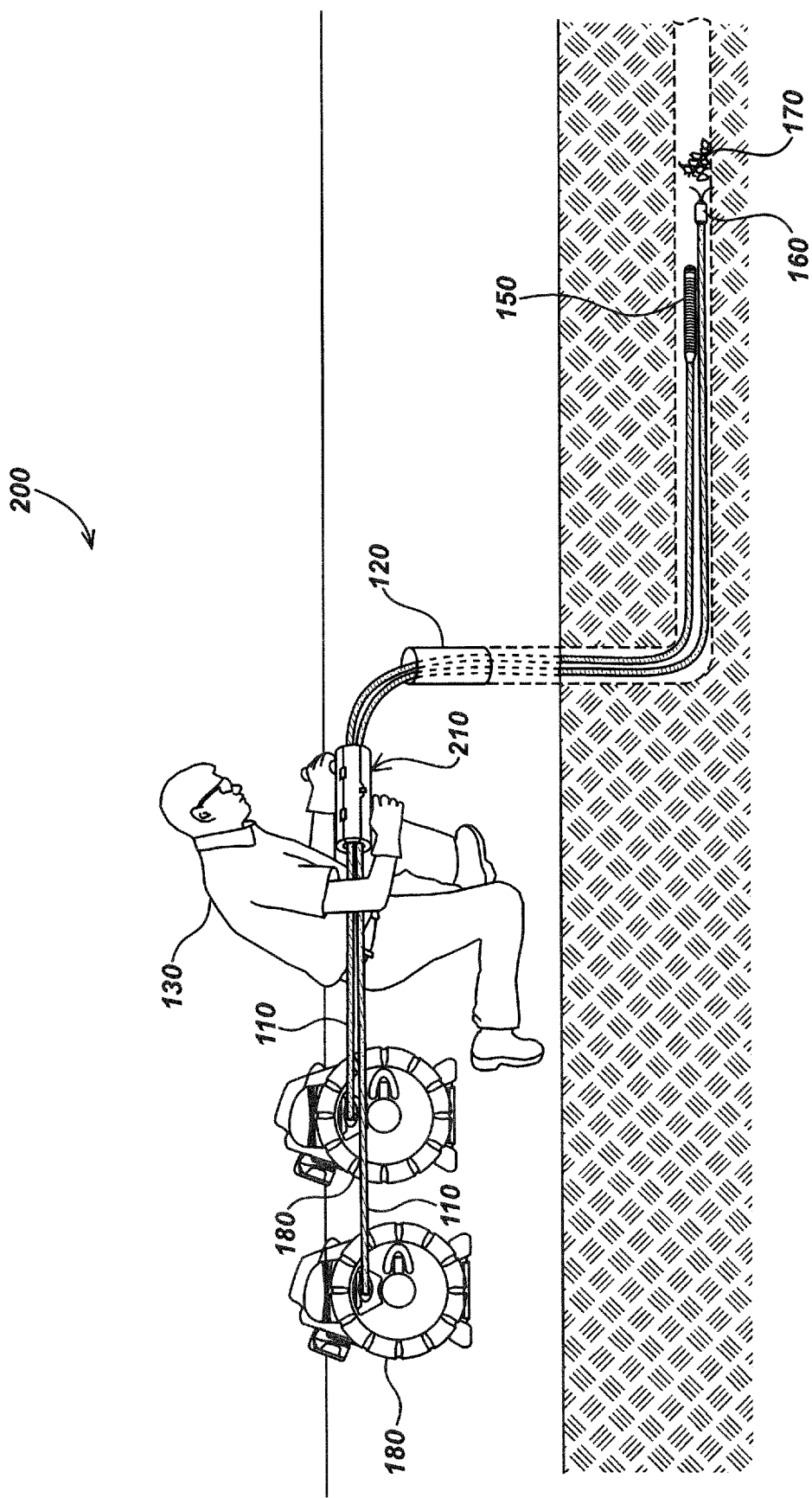
FIG. 2 is an illustration of an exemplary embodiment of an inspection and obstruction cleaning system including a cable handling device in accordance with certain aspects of the invention.

FIG. 2 illustrates details of an exemplary embodiment of an inspection and obstruction cleaning system 200 including a cable handling device 210 being held by a user 130 and being used to deploy or retract two cables 110 into a pipe or cavity 120 allowing the pipe or cavity 120 to be inspected and cleaned as necessary. One or more of the cables and/or hoses 110 may be a push-cable including a camera assembly 150 and one or more of the cables and/or hoses 110 may be a flex-shaft for providing power to a cutting tool 160, which may be used to clear an obstruction 170 in the pipe or cavity 120. The camera assembly 150 may include a flexible guide spring attached to an imaging device which may include additional sensors, electronics, and/or memory. Optionally, one or more of the cables and/or hoses 110 may be a hose which provides pressurized water or other fluid through a nozzle or jetter (not shown). The cutting tool 160 and/or pressurized water or other fluid forced through the nozzle or jetter (not shown) may be used to clear an obstruction 170 in the cavity or pipe 120. Optionally, one or more cables and/or hoses may be deployed from and stored on drum-reels 180.

Figure 3A:
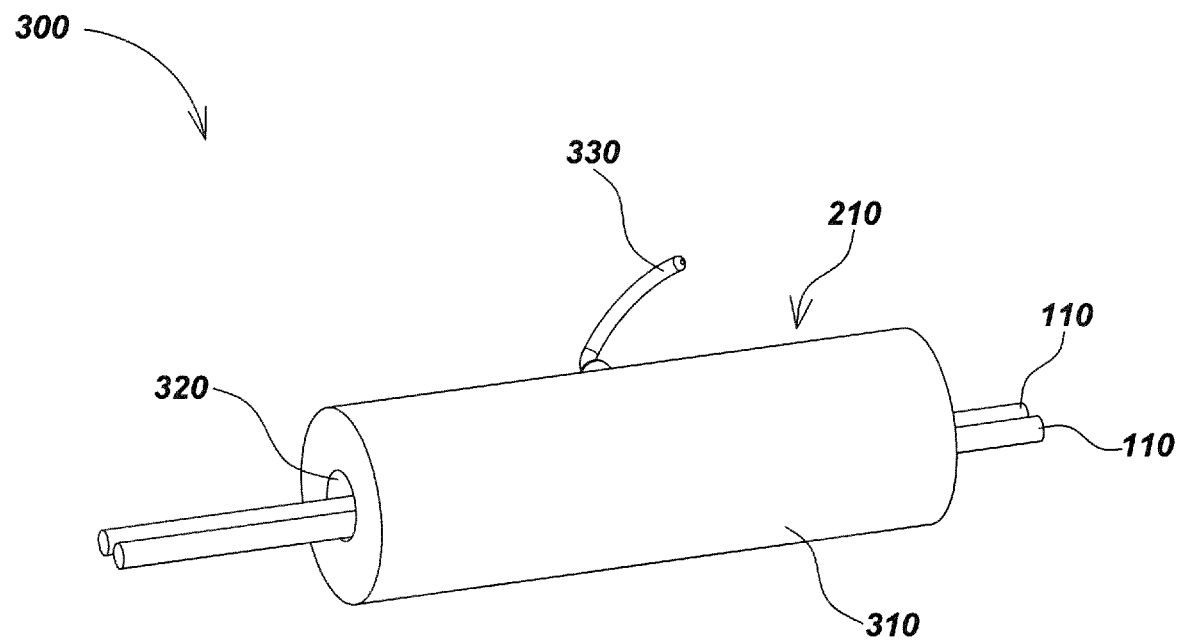
FIG. 3A is an illustration of an embodiment of a cable handling device that does not have a door in accordance with certain aspects of the invention.

FIG. 3A illustrates details of an exemplary embodiment 300 of a cable handling device 210 which has a housing 310 and a channel 320 through openings at opposite ends of the housing 310. The openings allow one or more cables or hoses 110 to be inserted through the channel 320 from one end to the other so that the one or more cables or hoses 110 may be coupled to the cable handling device 210. A coupling control 330 may be provided to activate an internal coupling mechanism (not shown) inside the cable handling device 210.

Figure 3B:
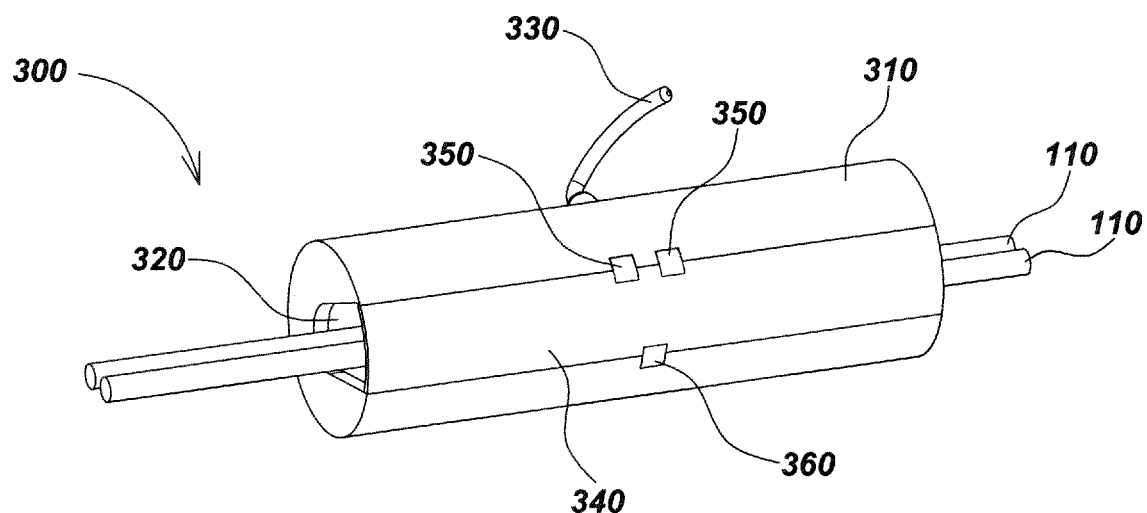
FIG. 3B is an illustration of an embodiment of a cable handling device that has a hinged door in accordance with certain aspects of the invention.

FIG. 3B illustrates details of an exemplary embodiment 300 of a cable handling device 210 which includes a door 340 which may include at least one hinge 350 and a latching mechanism 360. Door 340 may be opened allowing one or more cables or hoses 110 to be inserted into channel 320 and then secured by closing door 340 and then securing the door 340 with latching mechanism 360. The one or more cables or hoses 110 may be coupled to the cable handling device 210 by using a coupling control 330 to activate an internal coupling mechanism (not shown) inside the cable handling device 210. The door 340 may be made of a material that is non-transparent or transparent, or may include one or more windows, thus allowing a user to see the sections of the one or more cables and/or hoses 110 inside the cable handling device 210 when the door 340 is closed.

Figure 4A:
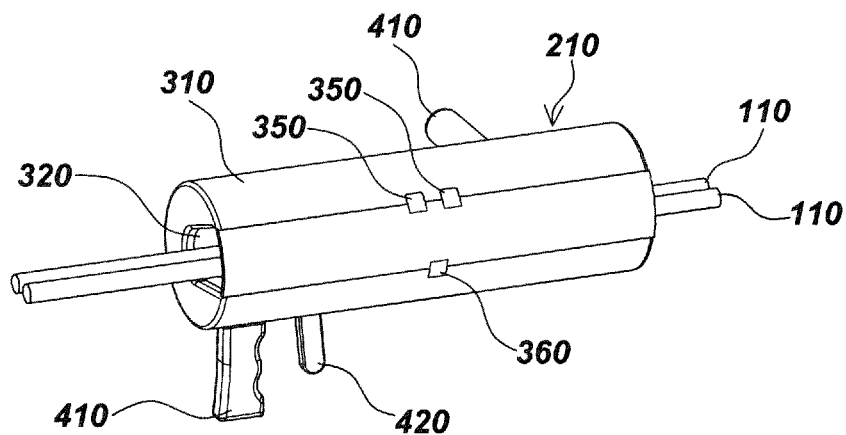
FIGS. 4A and 4B are illustrations of embodiments of a cable handling device that have a handle and at least one trigger in accordance with certain aspects of the invention.

FIG. 4A illustrates details of an exemplary embodiment 400 of a cable handling device 210 with handles 410 and a coupling control in the form of a single trigger 420. The trigger 420 allows a user to actuate movements of at least one cable and/or hose in a forward or backward direction by using the trigger 420. Trigger 420 may be used as coupling control 330 to activate an internal coupling mechanism (not shown) inside the cable handling device 210 to engage one or more cables and/or hoses placed in the cable handling device 210, thus facilitating deployment or retraction of at least one cable or hose into or out of a pipe or cavity by applying a manual or automatic force in the desired direction, i.e. deployment or retraction. When trigger 420 is released, it allows cable handling device 210 to move independently of the one or more cables and/or hoses. Trigger 420 may also include integrated speed and/or direction control to control the speed and/or direction of deployment or retraction of the one or more cables and/or hoses. Optionally, speed and/or direction control may be separate controls not associated with the trigger 420. Additionally, one or more triggers 420 may include a locking mechanism to allow one or more triggers 420 to be locked in an on or off position or any position in between.

Figure 4B:
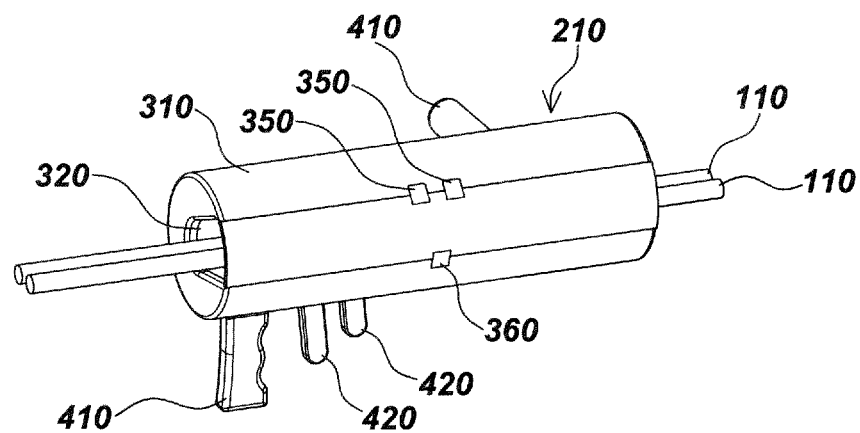

FIG. 4B illustrates details of an exemplary embodiment 400 of a cable handling device 210, with coupling controls in the form of a two triggers 420 (piggy backed) one in front of the other as shown, or in another configuration, e.g. side by side, etc.

Figure 5A:
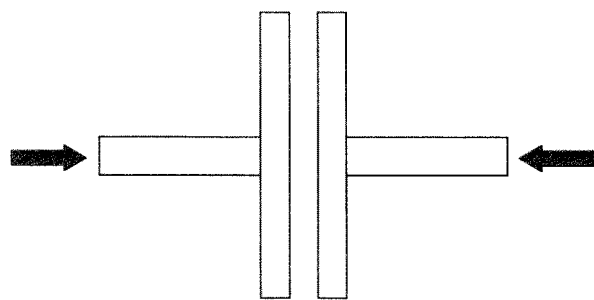
FIGS. 5A, 5B and 5C are illustrations of embodiments of a clutching mechanism, as known in the prior art.
Figure 5B:
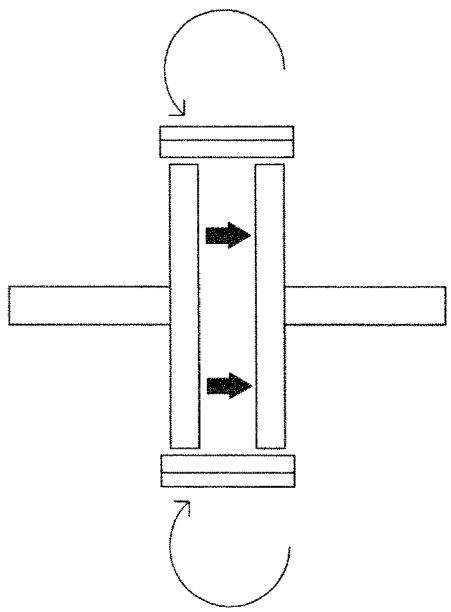
Figure 5C:
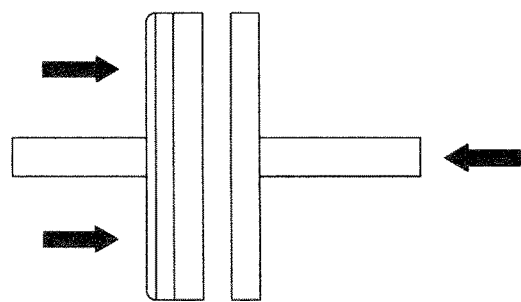

FIGS. 5A, 5B and 5C are some examples of clutch mechanisms that are well known in the art. FIGS. 5A, 5B and 5C represent a mechanical clutch, a magnetically controlled clutch and a disk type clutch, respectively. It would be understood by those of ordinary skill in the art that some embodiments could use a single clutch or multiple clutches to clamp one or more cables or hoses, and that the clutching mechanism could be various other well known clutching or clamping mechanisms and could be in many different configurations.

Clutches are well known in the art, and may include, by limited example only, friction type clutches with single or multiple plates, centrifugal clutches or flywheel type clutches. Clutch forces may be applied to one or more plates causing the plates to apply pressure against another surface or plate and used to secure one or more cables and/or hoses. The clutch force applied could be electromagnetic, pneumatic, manual pressure, or any other clutch type forces known in the prior art. The clutch could be completely released to allow the one or more cables and/or hoses to move freely, or could have a reduced force applied, thereby allowing the one or more cables and/or clutches to move by slipping a desired amount. The embodiments herein could be implemented with a single clutch or multiple clutches. The single or multiple clutches could be used to control (couple) a single cable and/or hose or multiple cables and/or hoses. The single or multiple clutches could be controlled by a single coupling control and/or multiple coupling controllers.

Figure 6:
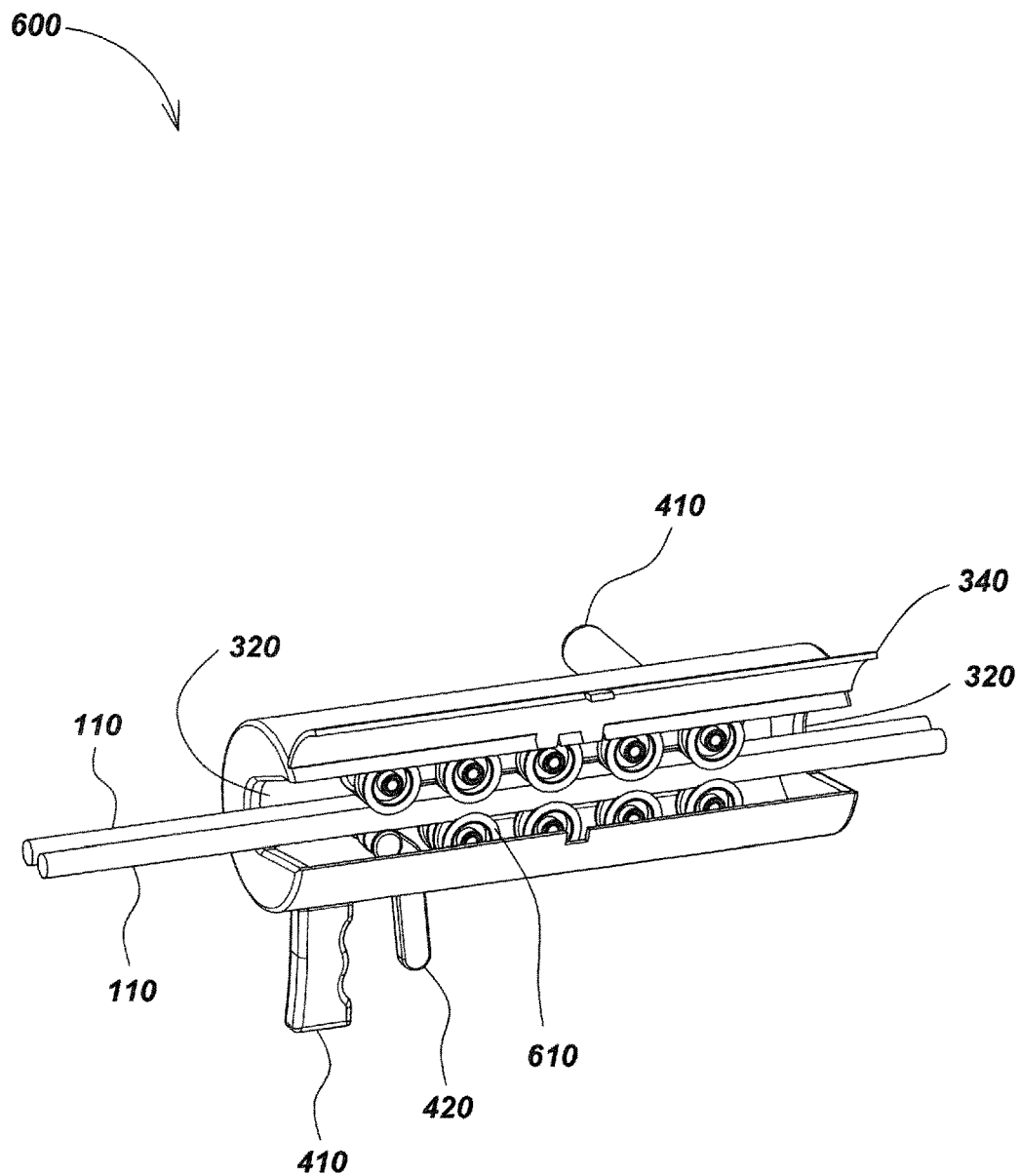
FIG. 6 is an illustration of an embodiment of a cable handling device with the door open allowing cables or hoses to be inserted and secured, or removed in accordance with certain aspects of the present invention.

FIG. 6 illustrates details of an exemplary embodiment 600 of a cable handling device with door 340 open to show a view of a wheels 610 which are controlled by an internal coupling mechanism (not shown) via a coupling control trigger 420. When trigger 420 is activated it causes the wheels 610 to engage with at least one cable and/or hose 110 and locks the wheels 610 so they can not rotate thereby allowing a user to apply force to the handles 410 of the cable handling device 600 so that the at least one cable and/or hose can be deployed or retracted into or out of a pipe or cavity. When the trigger 420 is released it allows the one or more cables and/or hoses to move freely by disengaging the internal coupling mechanism (not shown) thereby allowing the wheels to rotate freely and the allowing the cable handling device 210 to move independently of the at least one cable and/or hose.

Figure 7:
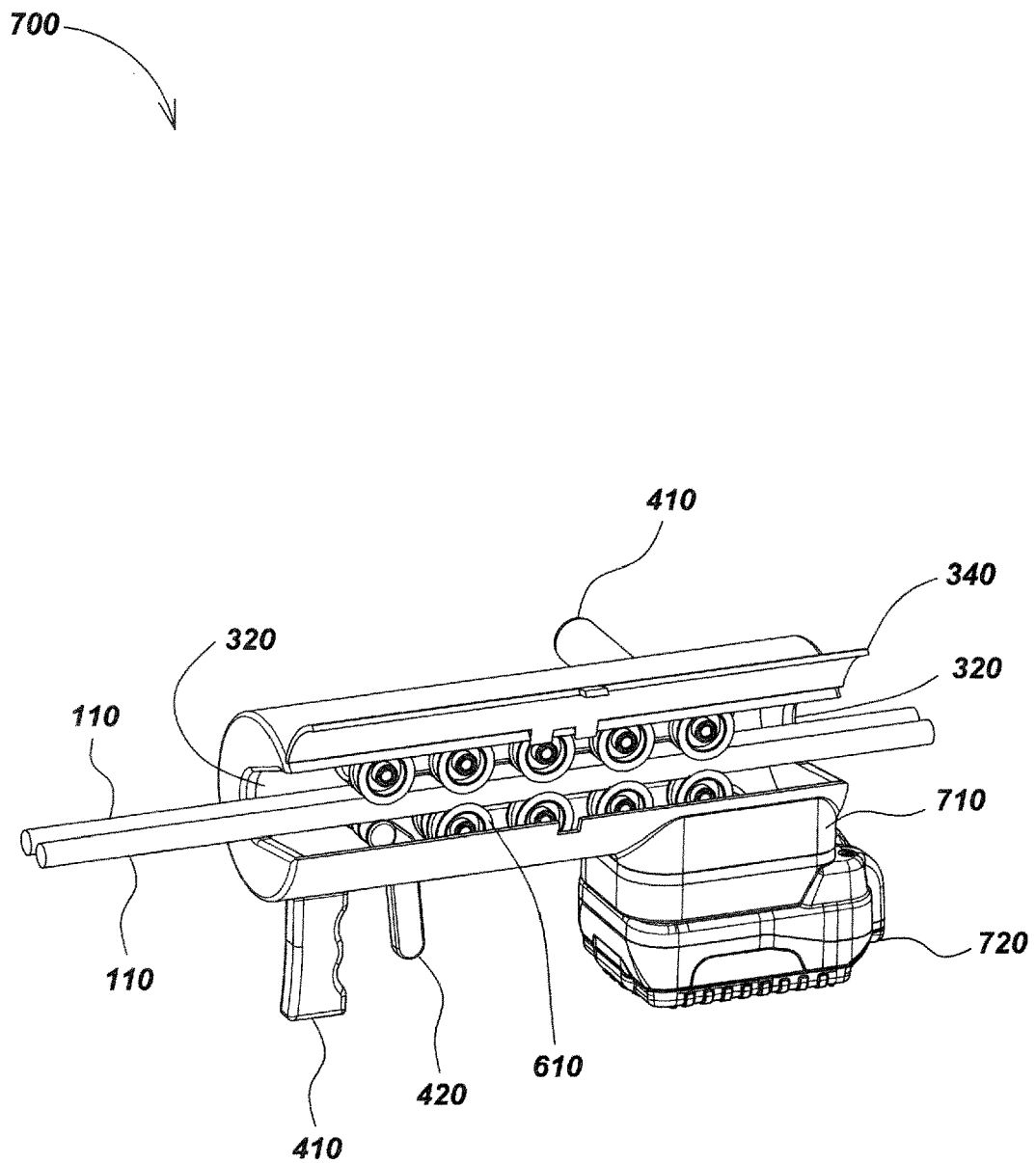
FIG. 7 is an illustration of an embodiment of a cable handling device with an automatic motorized wheel feeder powered by an external battery in accordance with certain aspects of the present invention.

FIG. 7 illustrates details of an exemplary embodiment 700 of a cable handling device 210 that includes a motorized feeder. Cable handling device 700 may include a motor 710 for rotating one or more wheels 610 to provide automatic feeding of one or more cables and/hoses for deployment or retraction into or out of a pipe or cavity. The motor 710 may be powered by a battery 720 which may be rechargeable and/or detachable, or another power supply. The trigger 420 is used to turn the motor 710 and thus the wheels 610 on or off. Trigger 420 may also provide speed control and/or directional control to the motorized wheels for deployment or retraction into or out of a pipe or cavity.

Figure 8A:
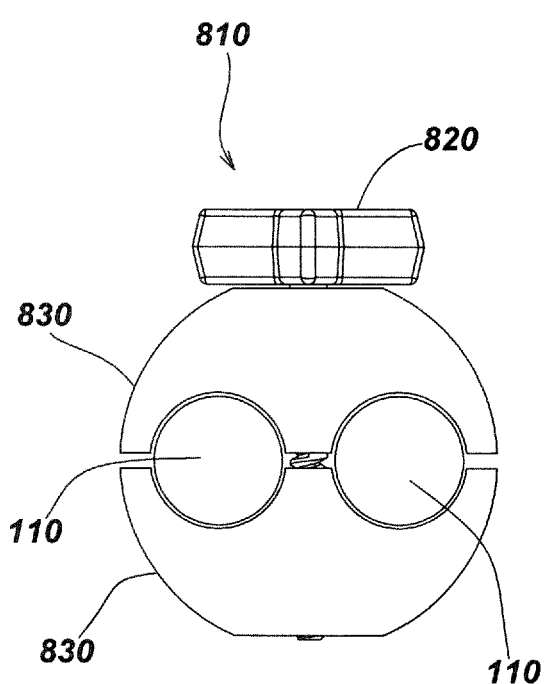
FIGS. 8A, 8B, 8C and 8D are illustrations of embodiments of various cable clips or guides as known in the prior art.
Figure 8B:
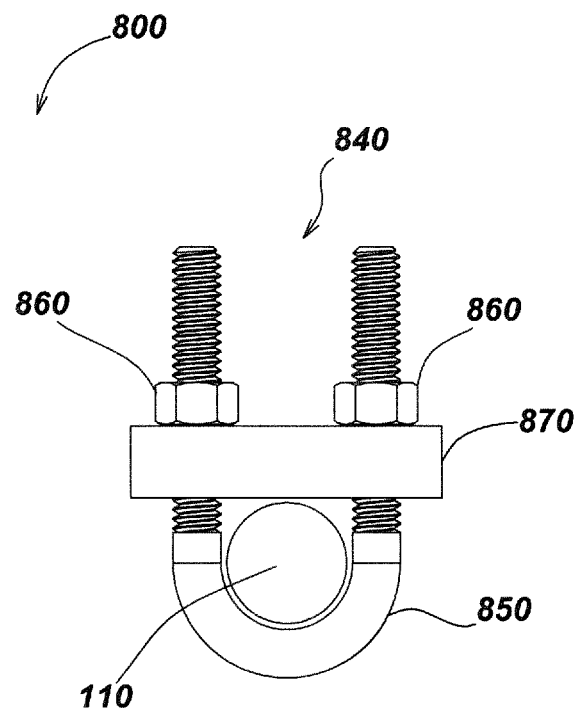

FIGS. 8A, 8B, 8C, 8D, 8E and 8F illustrate details of exemplary embodiments 800 of cable/hose clips and pipe guides, as known in the prior art. FIG. 8A shows a screw type clamp 810 with a hand screw 820 which when tightened closes clamps 830 which secure cables/hoses 110. FIG. 8B shows a U-bolt type clamp 840 with a two ended threaded U-bolt 850. When nuts 860 are tightened against the top side of bar 870, it causes the bottom side of the bar 870 to tighten against one or more cables/hoses 110, thereby securing them. In some exemplary embodiments, the cable clamps may be powered by one or more batteries (not shown).

Figure 8C:
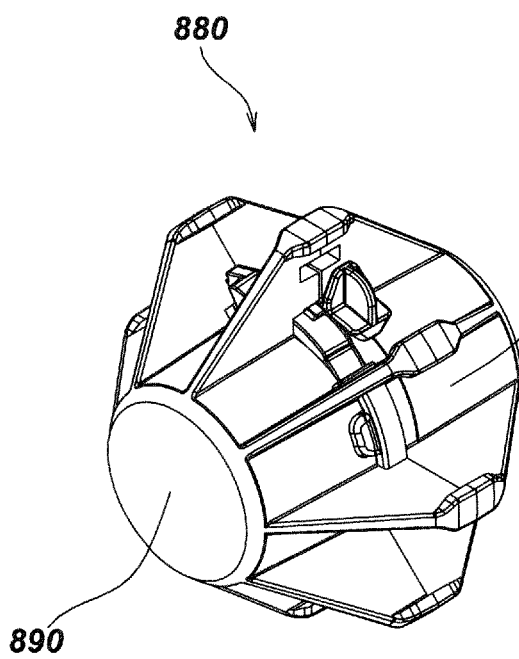
Figure 8D:
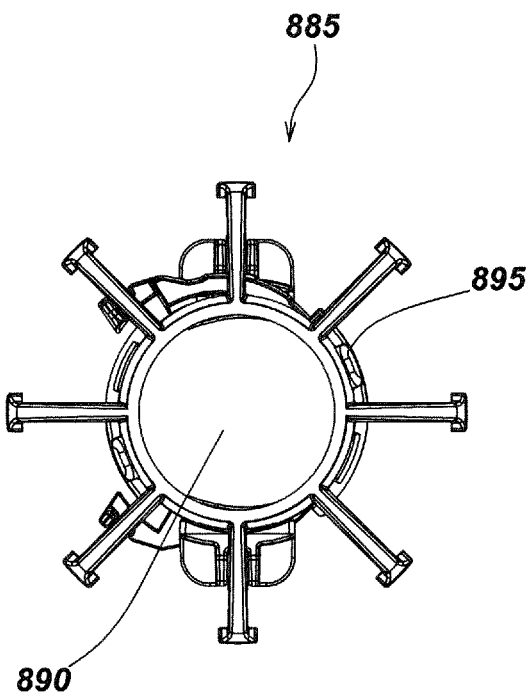

FIGS. 8C and 8D illustrate details of exemplary embodiments of cable/hose guides 880 and 885 which have similar but different shapes and features as known in the prior art. A first cable/hose 110 is threaded and secured through a center channel 890 of the guides 880 and 885, and additional cables/hoses are guided along one or more channels 895.

Figure 9C:
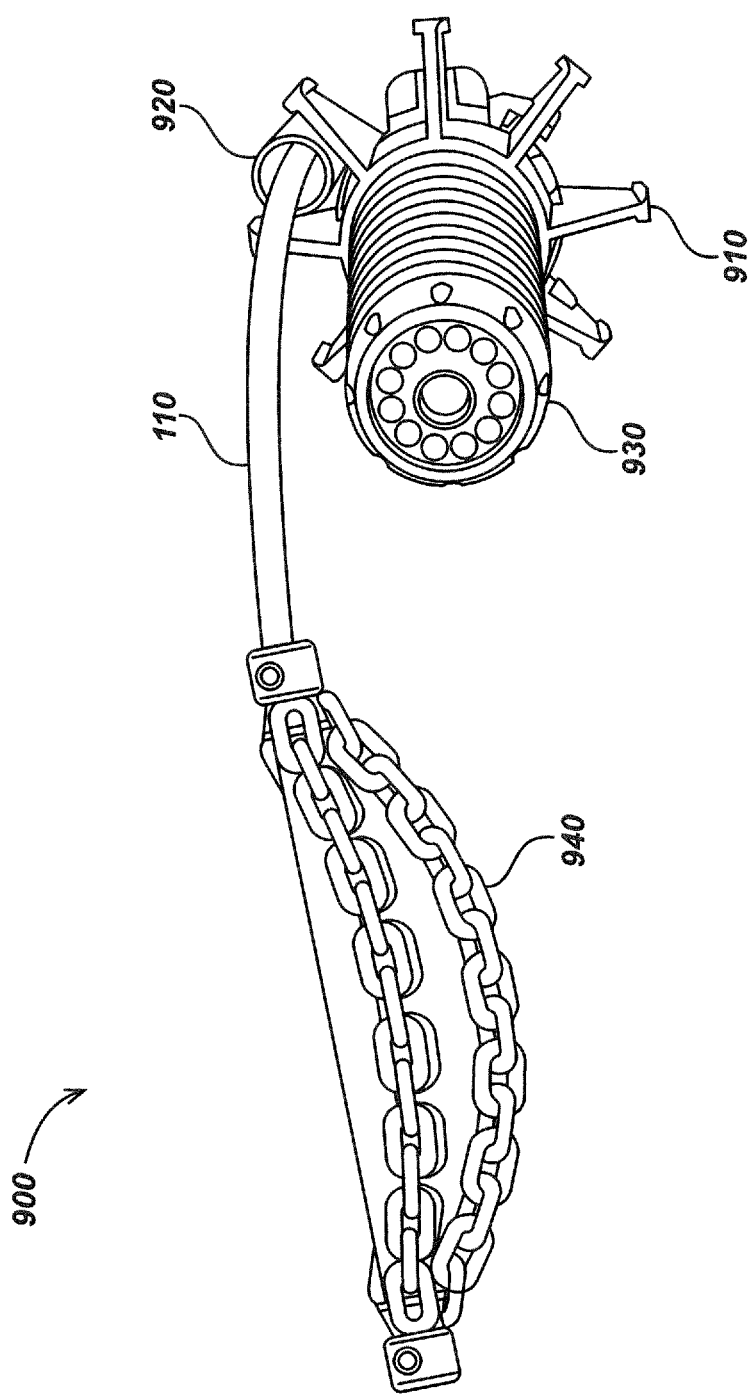

FIGS. 9A, 9B and 9C illustrate details of an exemplary embodiment 900 of a pipe guide 910 integrated with a cable/hose stop 920. In this example, cable 110 is a push-cable which is used to push or pull a camera head 930 into or out of a pipe or cavity during deployment or retraction of the camera head 930. As the camera head 930 is being pushed into a pipe or cavity via the push cable 110, another cable 110 which in this example is a flex-shaft being used to supply rotational power to a chain knocker 940 is also pushed into the pipe or cavity. Push cable 110 which is attached to the camera via a spring. The spring fits snuggly into cable guide 910 which is attached to cable stop 920. As cable guide 910 is moved forward the stationary cable stop 920 pushes again the proximal end of the chain knocker causing the flex-shaft 110 and the chain knocker 940 to be moved the same distance and at the same speed as the push cable, thereby allowing the push cable to deploy the chain knocker 940. In this type of deployment no power should be supplied to the chain knocker 940. As the push-cable is being pushed, the guide-stop prevents the chain knocker 940 from moving backwards towards the camera 930. A typical chain knocker 940 may include a pair of set screws which when tightened allow the chain end-caps to be secured against the flex-shaft 110, thereby allowing the chain knocker 940 to remain in place.

FIG. 9B shows the chain knocker 940 ready to cut/clear a pipe or cavity blockage. The chain knocker 940 is in a open position caused by power being supplied to the flex-shaft 110. At this time the flex-shaft 110 and the chain knocker 940 can be moved freely forward ahead of the camera 930, thereby, preventing damage to the camera 930 while power is being supplied to the chain knocker 940 in order to facilitate cutting of a blockage (e.g. tree roots, debris, etc.).

FIG. 9C shows a different view of a pipe guide 910 integrated with a cable/hose stop 920 using a slightly different shaped pipe guide 910. In some exemplary embodiments, cable/hose stop 920 may be removable attached to pipe guide 910 via a clamp or other mechanism. The pipe guide may be designed to fit snuggly around a specific diameter cable/hose 110, or shim tubes with collars may be inserted between the cable/hose 100 and the pipe guide to achieve the desired fit.

Figure 9D:
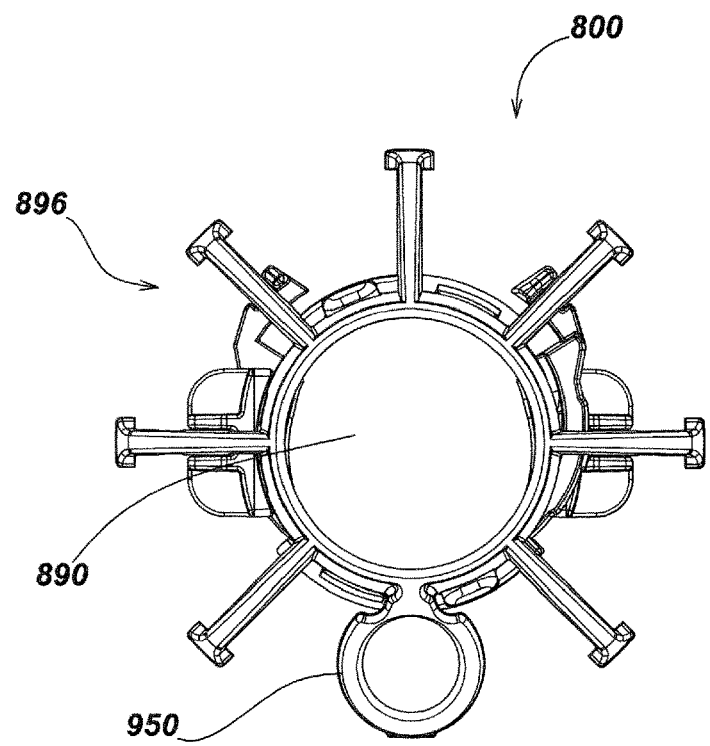
Figure 9E:
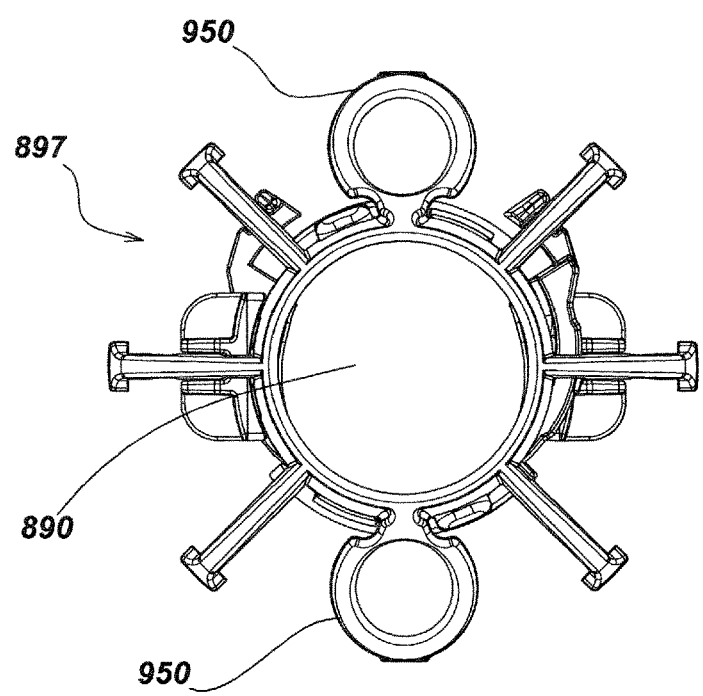

FIGS. 9D and 9E illustrate details of exemplary embodiments 800 of pipe guides 896 and 897 which may include one or more closed guides 950 dispersed among the guide channels 895 and used as a guide-stop to prevent a chain knocker 940 (not shown) from moving backwards towards the camera 930 (not shown).

Figure 10:
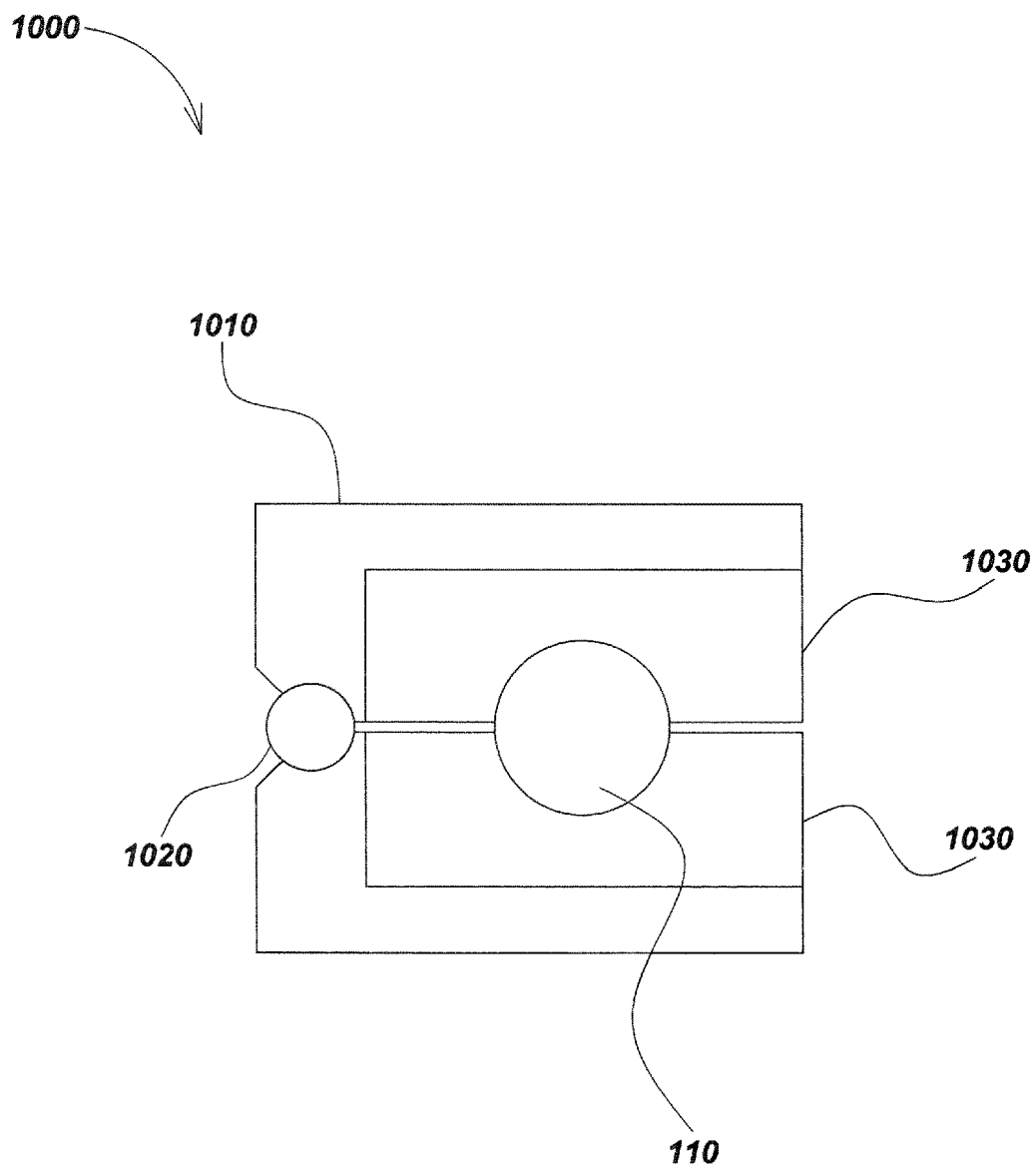
FIG. 10 is a cross-section illustration of an embodiment of an integrated cable/hose cleaner.

FIG. 10 illustrates details of an exemplary embodiment 1000 of a cable/hose cleaner. A clamp 1010 with and adjustable tightening screw 1020 can be tightened causing cleaning elements (e.g. sponges, cloth, etc.) 1030 to come in contact with one or more cables/hoses 110 which will be wiped off as they are drawn through the cleaning elements 1030.

Figure 11:
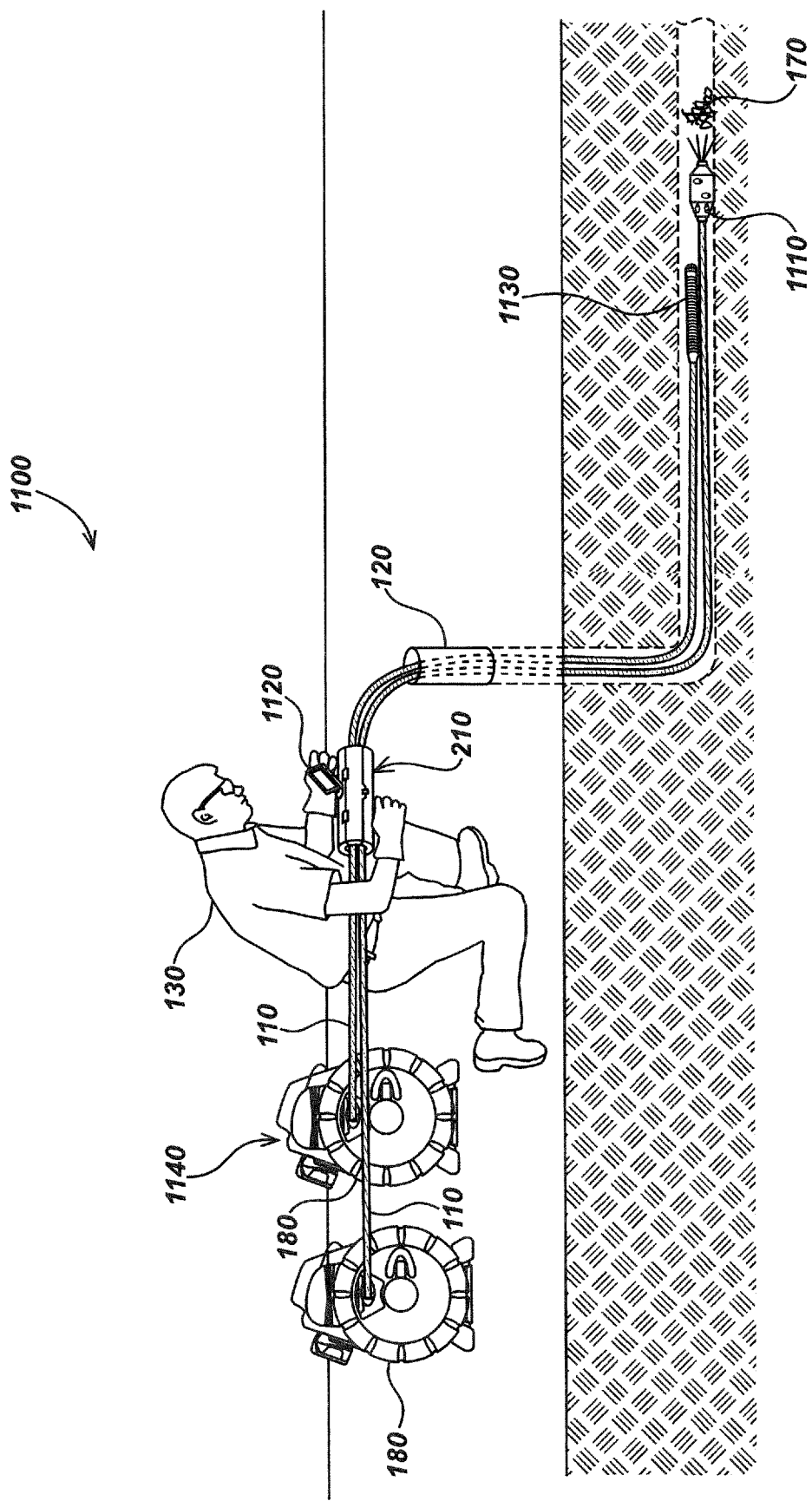
FIG. 11 is an illustration of an embodiment with a cable handling device used with a camera and a jetter in accordance with certain aspects of the present invention.

FIG. 11 illustrates details of an exemplary embodiment 1100 of a cable handling device 210 being held by a user 130 and being used to deploy or retract two cables 110 into a pipe or cavity 120 allowing the pipe or cavity 120 to be inspected and cleaned as necessary. One or more of the cables and/or hoses 110 may be a camera assembly 150 and one or more of the cables and/or hoses 110 may be a hose for providing pressurized water or other fluid through a nozzle or jetter 1100. The pressurized water or other fluid forced through the nozzle or jetter 1100 may be used to clear an obstruction 170 in the cavity or pipe 110. Optionally, one or more cables and/or hoses may be deployed from and stored on drum-reels 180.

In one exemplary embodiment, video images and/or data may be shown on a display 1120 with an integrated radio transceiver (not shown) that may receive image data wirelessly from a transceiver 1130 integrated with the camera assembly 150 and/or a transceiver 1140 integrated with an optional drum-reel 180. This provides a user 130 with visual information from the camera assembly 150 that can be used to steer the camera assembly 150 and/or the nozzle or jetter 1110 to aid in locating an obstruction 170 and removing it with pressurized water or fluid from the nozzle or jetter 1110. In some embodiments, the obstruction 170 may be removed using a cutting tool powered by an electrical cable 110 or a flex-shaft 110.

Figure 12B:
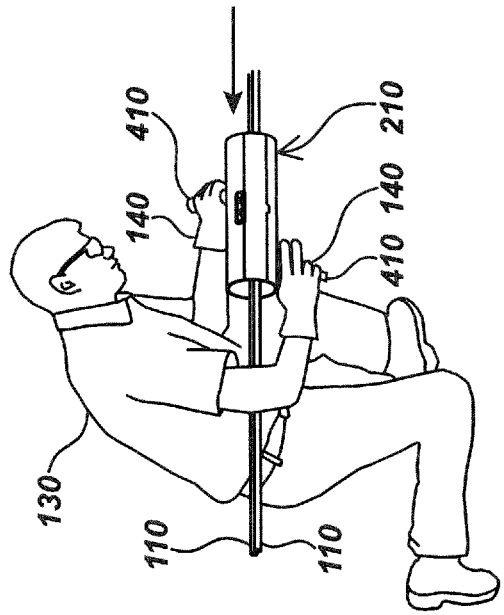
FIGS. 12A and 12B are illustrations of embodiments of a cable handling device being used to deploy or retract a cable or hose into a pipe or cavity manually.
Figure 12A:
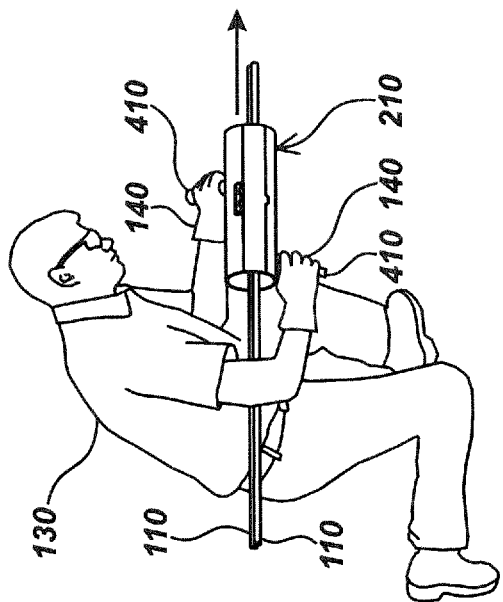

FIGS. 12A and 12B are illustrations of embodiments 1200 of a cable handling device 210 being used to deploy a cable or hose into a pipe or cavity (not shown) manually. In FIG. 12A a user 130 grabs the handles 410 with their hands 140, exerts pressure on the trigger (not shown) which activates an internal coupling mechanism (not shown) inside the cable handling device 210. The user 130 then uses the handles 410 to push the one or more cables and/or hoses 110 into a pipe or cavity (not shown). Since the coupling mechanism is engaged via the trigger, as the user 130 exerts force on the handles in a forward direction away from their body as shown by the arrow, the one or more cables and/or hoses move in the same direction. As shown in FIG. 4B, once the user 130 has pushed the one or more cable/and/or hose forward, they can then release the trigger which releases the coupling mechanism from the one or more cables and/or hoses, thereby allowing the cable handling device 210 to be pulled back towards the user 130 without affecting the position of the one or more cables and/or hoses 110. A user can then repeat the process to deploy the desired amount of the one or more cables and/or hoses into the pipe or cavity.

The one or more cables and/or/hoses 110 may be retracted from the pipe or cavity by exerting pressure on the trigger and pulling the one or more cables and/or hoses out of the pipe or cavity. The trigger can be released to allow the cable handling device 210 to be pushed forward independent of the one or more cables and/or hoses and then the trigger can again be activated to repeat the process until the desired amount of the one or more cables and/or hoses has been retracted from the pipe or cavity.

FIG. 13A illustrates details of an exemplary embodiment 1300 using a remote controlled clamp 1310 and 1320 to provide clamping of a camera cable 110 attached at the distal end to a camera assembly 150 and/or to a flex-shaft 110 connected to a chain knocker 940. Clamp 1310 which includes an optical sensor is attached securely to the camera cable 110 in a position behind the camera assembly 150. The camera includes LED's which can be modulated to transmit a signal which can be received by the sensor in clamp 1310. Clamp 1310 is communicably coupled to clamp 1320. The modulated signal from the LEDs can be received by the sensor in clamp 1310 and used to control the opening and closing of clamp 1320.

FIG. 13B illustrates details of an exemplary embodiment which includes a steering stick 1330 to help steer the camera assembly 1310 into a desired position. In FIG. 13B clamp 1310 is located proximal to the camera assembly 150. Clamp 1320 is a smaller diameter than the base side of the chain knocker 940 so that the chain knocker 940 stops when it comes in contact with clamp 1320. Clamp 1310 which includes a sensor is attached securely to the camera cable 110 in a position behind the camera assembly 150. The camera includes LED's which can be modulated to transmit a signal which can be received by the sensor in clamp 1310. Clamp 1310 is communicably coupled to clamp 1320. The modulated signal from the LEDs can be received by the sensor in clamp 1310 and used to control the opening and closing of clamp 1320.

FIG. 13C illustrates details of an exemplary embodiment which include an additional transmitter 1340 for transmitting control signals to open or close clamp 1320 via the sensor included with clamp 1310. In this exemplary embodiment, transmitter 1340 may be configured to send a wireless radio signal.

Figure 14A:
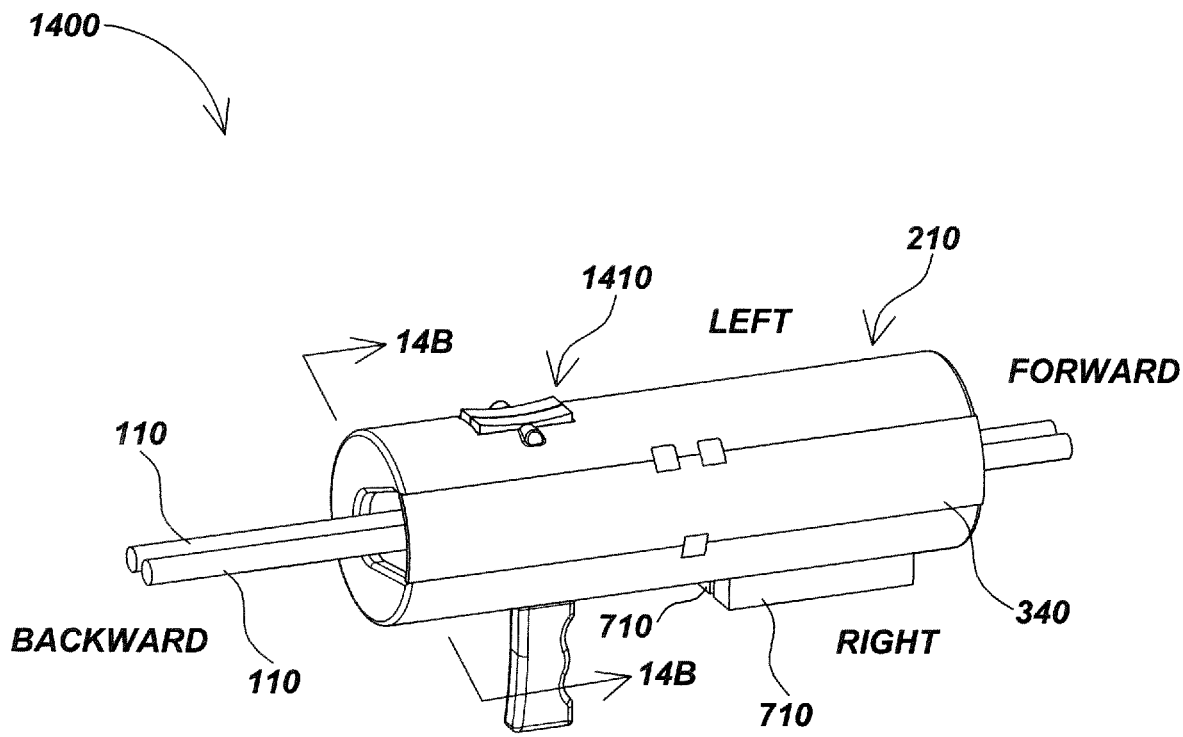
FIG. 14A is an illustration of an embodiment of a cable handling device configured with a dual-rocker seven-position switch.

FIG. 14A illustrates details of an exemplary embodiment 1400 of a cable handling device 210 with a dual-rocker seven-position push switch 1410. Two cables and/or hoses 110 left and 110 right can be controlled with dual-rocker seven-position push switch 1410 which includes a left side rocker switch and a right side rocker switch configuration via a first motorized cable or hose feed element and/or a second motorized cable or hose feed element, wherein the switch is configured to control a forward feeding direction or a backward feeding direction of the one or more cables or hoses 110 via the first motorized cable or hose feed element and/or the second motorized cable or hose feed element which may be implemented using several motorized wheels 610, FIG. 14B. The motors 710 for powering the wheels 610 may be internal or external to the cable handling device 210.

Figure 14B:
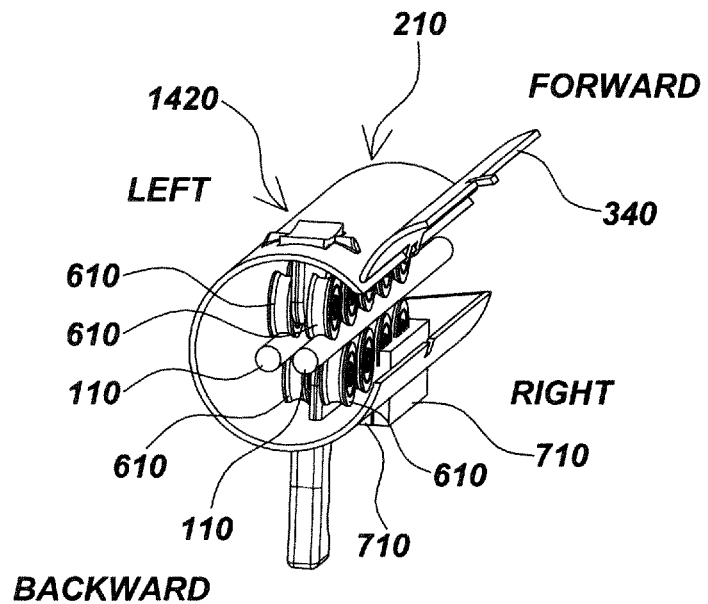
FIG. 14B is an illustration of an embodiment of a cable handling device configured with a single-rocker seven-position switch.

FIG. 14B is a cross-section illustration of an exemplary embodiment 1400 of a cable handling 210 device with a single-rocker seven-position switch 1420. Door 340 is open to better show motorized wheels 610 which can be used to deploy and retract cables and/or hoses 110 in either together or individually in a forward or backward direction using a single-rocker seven-position push switch 1420.

Figure 15A:
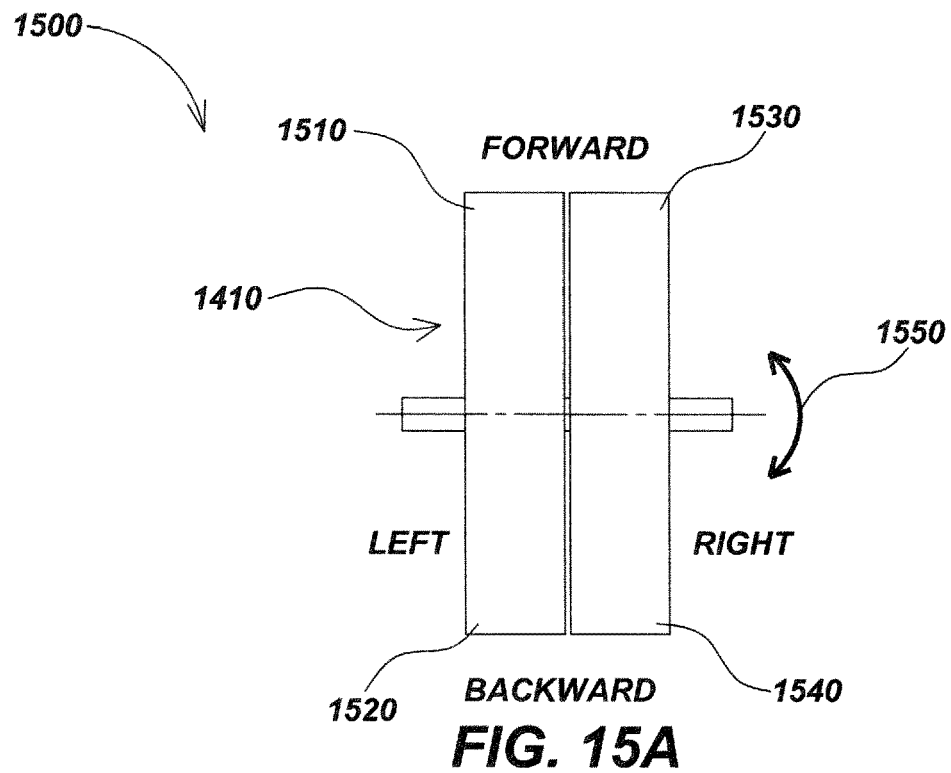
FIG. 15A is an illustration of an embodiment of a dual-rocker seven-position push switch.

FIG. 15A is an illustration of an embodiment of a dual-rocker seven-position push switch 1410 which includes a side by side left and right rocker switch configuration. The left rocker switch and the right rocker switch rock around an axis 1550 and have a neutral position, a forward position, and a backward position for feeding at least one of a first cable and a second cable in a forward direction (for deploying a cable or hose) or a backward direction (for retracting a cable and/or hose). When both the left rocker switch and the right rocker switch are in a neutral position (not moved to either side of the axis 1550) the motorized wheels 610, FIG. 14B will remain inactive. When both the left rocker and right rocker switch are in the forward position, that is, when switch corners 1510 and 1530, respectively, are pushed down simultaneously, both the left cable or hose 110, FIG. 14B and the right cable or hose 110 will be simultaneously fed forward (deployed), and when the left rocker switch and the right rocker switch are in the backward position 1520 and 1540, respectively, both the left cable or hose 110 and the right cable or hose 110 will be fed in the backward direction (retracted). If either the left rocker or right locker switch are moved independently of each other, they will control a single cable or hose depending on the switch or direction chosen. For example, moving the left rocker switch in the forward direction 1510 will deploy the left cable (move it in a forward direction), and moving the left rocker switch backward 1520 will retract the left cable (move it in a backward direction). Moving the right rocker switch forward 1530 will deploy the right cable (move it in a forward direction), and moving the right rocker switch backward 1540 will retract the right cable (move it in a backward direction).

Figure 15B:
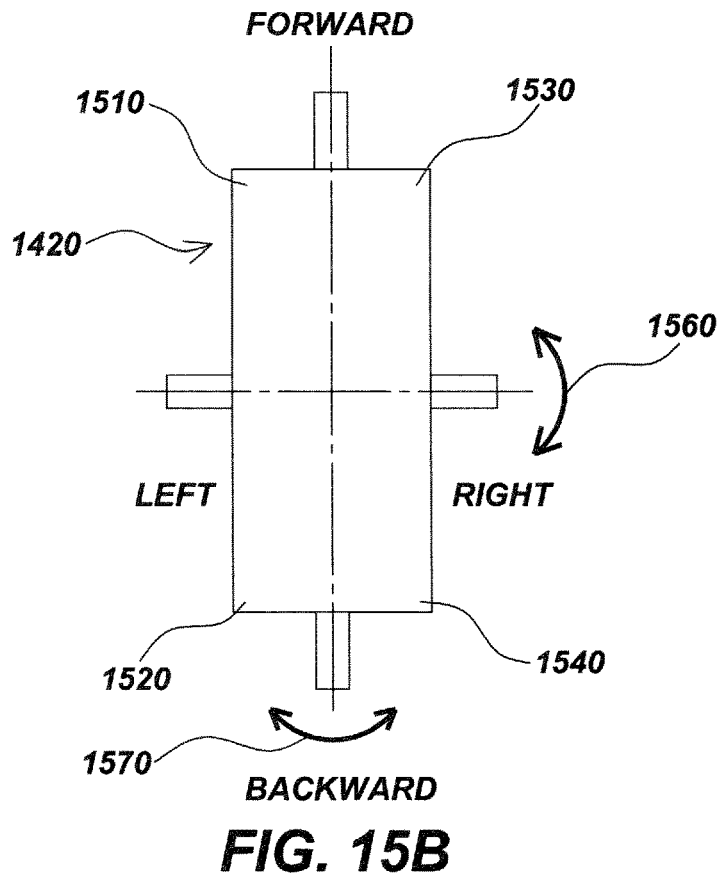
FIG. 15B is an illustration of an embodiment of a single-rocker seven-position switch.

FIG. 15B is an illustration of an embodiment 1500 of a single-rocker seven-position push switch 1420 that can be used for controlling two motorized cable or hose feed elements (not shown) in order to deploy or retract one or more cables or hoses (not shown). Applying pressure by touch specific points 1510, 1520, 1530 and 1540 on rocker switch 1420 will cause either of a left cable or a right cable 610, FIG. 14B, or both, to move in a forward (deployment) or backward (retraction) direction. The single-rocker seven-position push switch 1410 is configured to tilt forward or backward around an axis 1560, or sideways around an axis 1570, or a combination thereof. For instance, when switch 1410 is moved in a forward-left position by pushing on 1510, the left cable or hose 610, FIG. 14B will move in a forward (deployment) direction. Other switch positions for controlling the feeding direction of the left cable 610 or right cable 610, FIG. 14B are a backward-left position 1520 for feeding the left cable or hose in a backward direction, a forward-right position 1530 for feeding the right cable or hose in the forward direction, a forward position 1510 and 1530 for feeding both the left cable or hose and the right cable or hose in a forward direction simultaneously; and a backward position 1520 and 1540 for feeding both the left cable or hose and the right cable or hose in a backward direction simultaneously.

Figure 16:
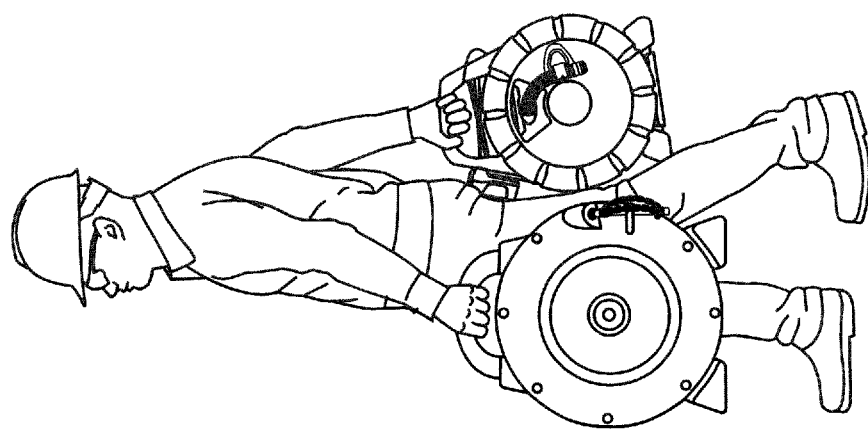
FIG. 16 is an illustration of a typical method for transporting drum-reels storing cables or hoses to a pipe or cavity inspection location, as known in the prior art.

FIG. 16 is an illustration of a typical method for transporting drum-reels storing cables or hoses to a pipe or cavity inspection location, as known in the prior art.

FIGS. 17A and 17B are front and side views, respectively, of an illustration of a dual camera drum system in a side-by-side docked configuration 1700. FIG. 17A shows a first drum-reel 1710 configured for storing and deploying a flex-shaft cable 1720. A handle 1730 is provided for carrying the first drum-reel 1710 to a desired location. Also shown is a second drum-reel 1740 configured for storing and deploying a camera cable with an attached camera 1750. A handle 1760 is provided for carrying the second drum-reel 1740 to a desired location. A docking mechanism not shown is used to removably couple the second drum-reel 1740 to the first drum-reel 1710 via a hub 1770 connected to the first drum-reel 1700, thereby, allowing a user to carry both drum-reels to a desired location using only the handle 1730 of the first drum-reel 1710.

Figure 17D:
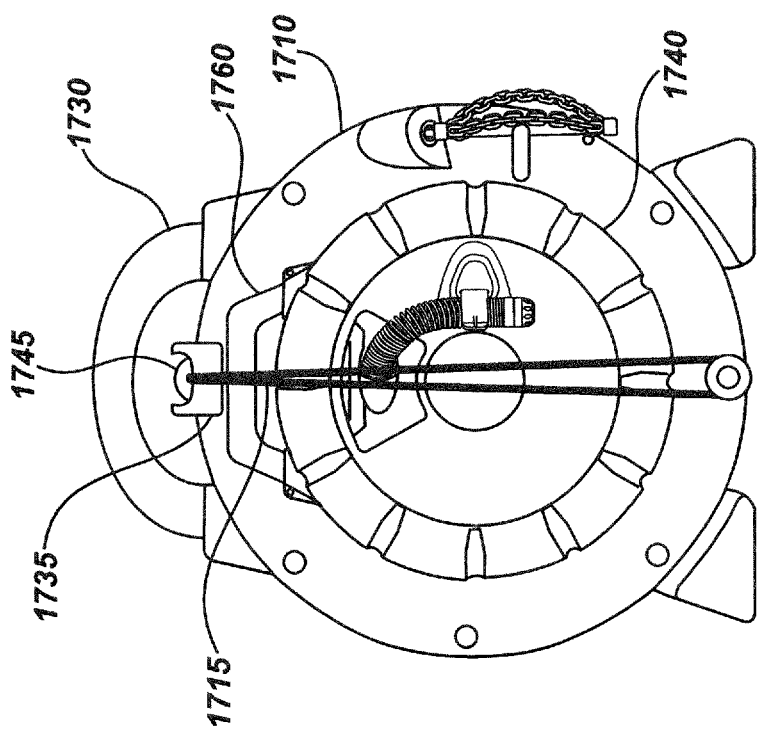
FIGS. 17C-17H are illustrations of embodiments of docking mechanisms for use in dual camera drum system in a side-by-side docked configuration.
Figure 17C:
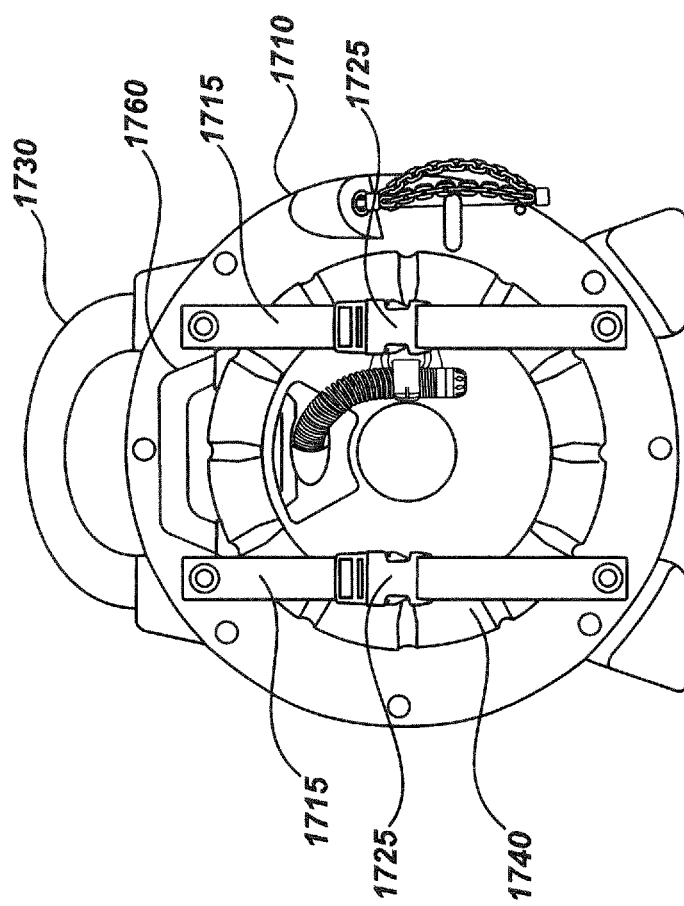

FIGS. 17C and 17D are illustrations of embodiments of docking mechanisms configured with one or more straps 1715 for use in a dual camera drum system in a side-by-side docked configuration. In FIG. 17C, two straps 1715 are attached on opposite ends of the larger flex-shaft drum-reel 1710 and are configured to hold the smaller camera-cable drum reel 1740 in place by using strap connectors 1725. In some example embodiments, the strap connectors 1725 may allow the straps 1715 to be threaded through the strap connectors 1725 and tightened, however, in other sample embodiments the strap connectors 1725 may snap, clip, or hook and loop in place. The straps 1715 may be cloth and made of a non-flexible material or may be flexible allowing them to stretch to secure the camera-cable drum-reel 1740 in place. In other embodiments, a single strap 1715 may be used, as shown in FIG. 17D. The single strap 1715 may be configured as a flexible cord that can stretch, for example a bungee type cord. In this configuration the single strap/cord may be attached to the bottom of the larger flex-shaft drum-reel 1710 and a prong type clasp 1735 be provided at the top of the flex-shaft drum-reel 1710 to allow a clasp or ball 1745 to hold the camera-drum reel 1740 in place by being inserted on or into the prong type clasp 1735 and held in place by tension.

Figure 17F:
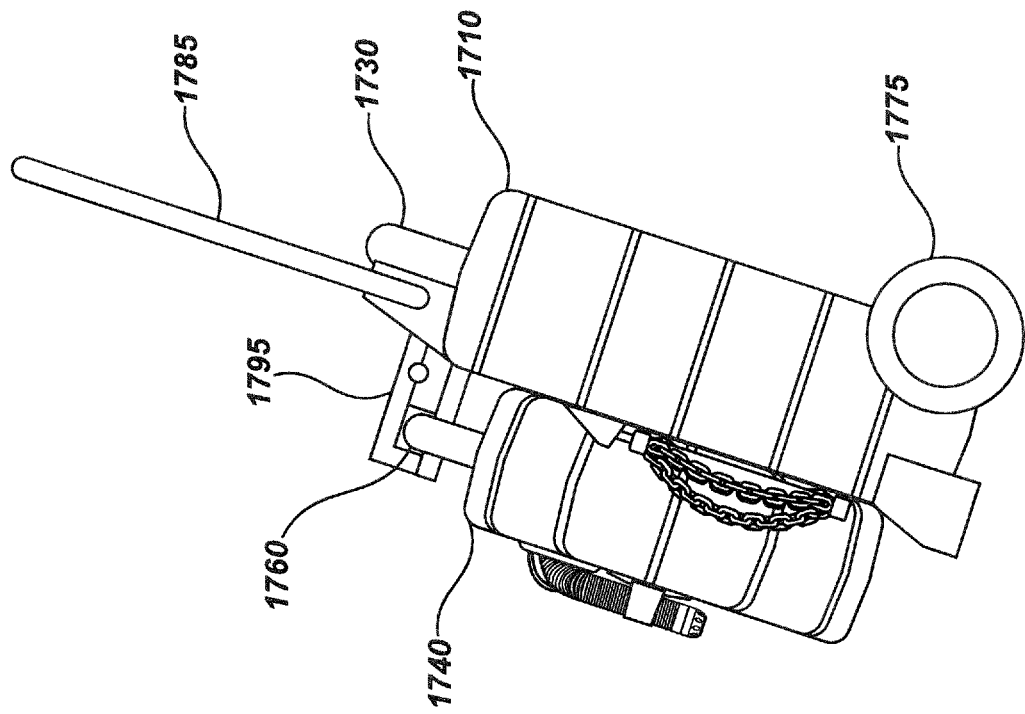
Figure 17E:
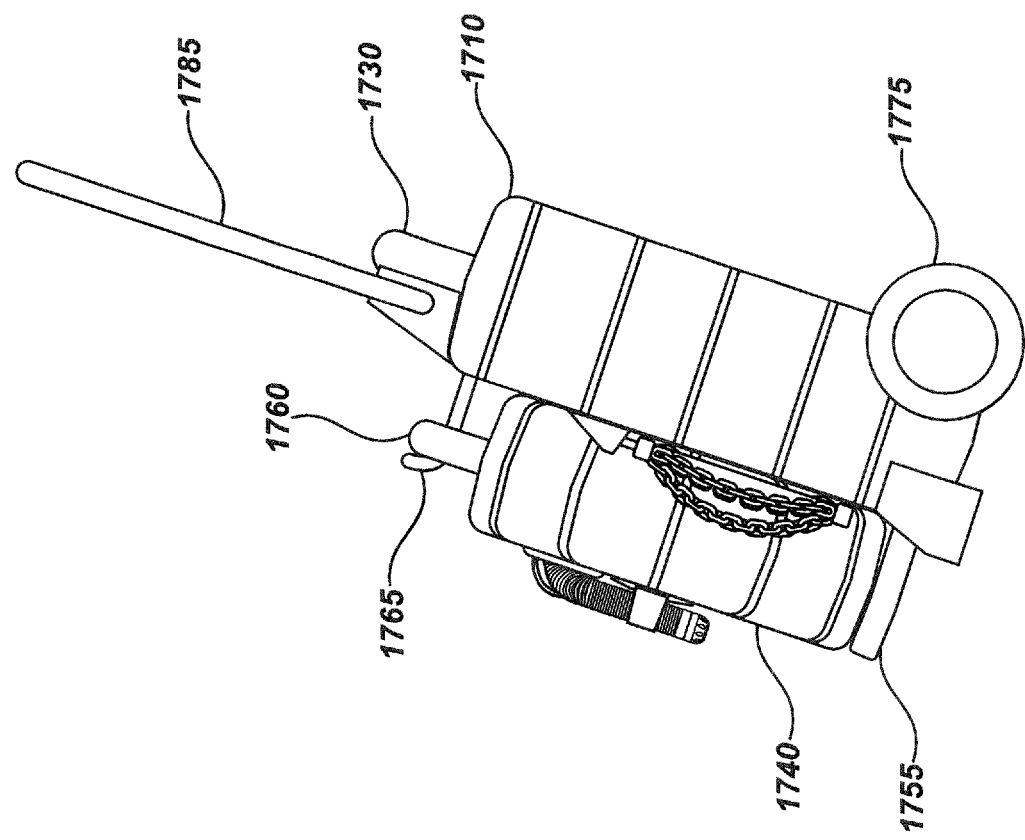

FIG. 17E is an illustration of an embodiment of a docking mechanism that is configured with a pedestal 1755 for placing the camera drum-reel 1740 on and a hook 1765 for going through the camera-drum reel handle 1760 and securing the camera drum-reel 1740 in place. In some embodiments, wheels 1775 may be provided on the bottom of flex-shaft drum-reel 1710, as well as an extra handle 1785 for allowing flex-shaft drum-reel 1710 to be leaned back onto wheels 1775 (similar to a dolly), and then both drum-reels may be moved to a desired location. In some embodiments, handle 1785 may be configured to be permanent or may be configured to be detachable. In other embodiments, handle 1785 may be configured to fold up and down telescopically, or in some other configuration.

Figure 17H:
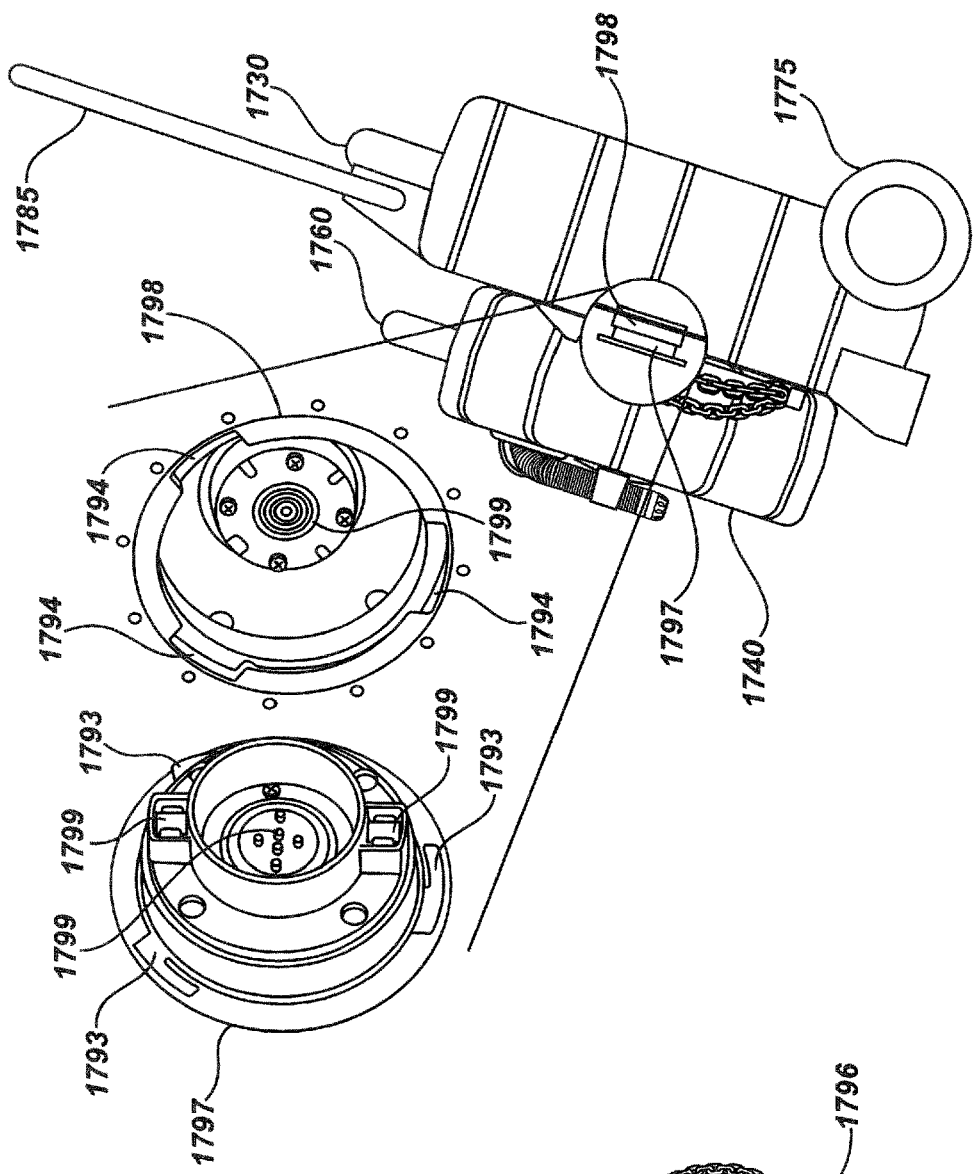
Figure 17G:
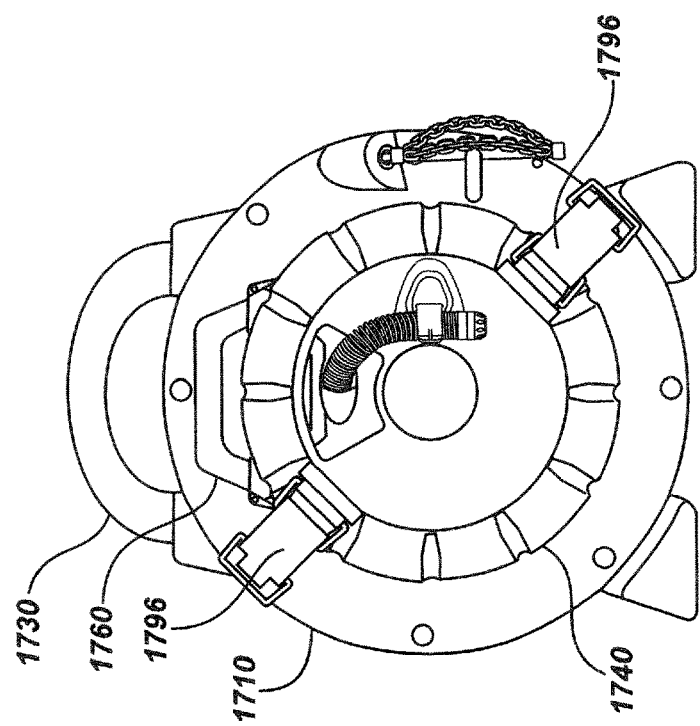

FIGS. 17F and 17G are illustrations of embodiments of docking mechanisms configured with a clamp type latch 1795 and a wire type latch 1796, respectively. Clamp latch 1795 can be opened and closed by applying pressure in the downward or upward direction to engage and disengage the clamp latch 1795 or the wire latch 1796. FIGS. 17F and 17G are example embodiments. It would have been obvious to one skilled in the art that many other latch styles and configurations could be provided, each with its own specific advantages and disadvantages.

FIG. 17H is an illustration of an embodiment of a docking mechanism that is configured with rotating and interlocking male 1797 and female coupling parts 1798. Male coupling part 1797 has one or more tabs 1793 that connect with one or more slots 1794 in female coupling part 1798. In some embodiments, the one or both of the coupling parts 1797 and 1798 may include pins, surfaces, tabs, or the like, for providing electrical connections between the coupling parts 1797 and 1798. It would have been obvious to one skilled in the art that many other interlocking coupling part styles and configurations could be provided, each with its own specific advantages and disadvantages.

Figure 18A:
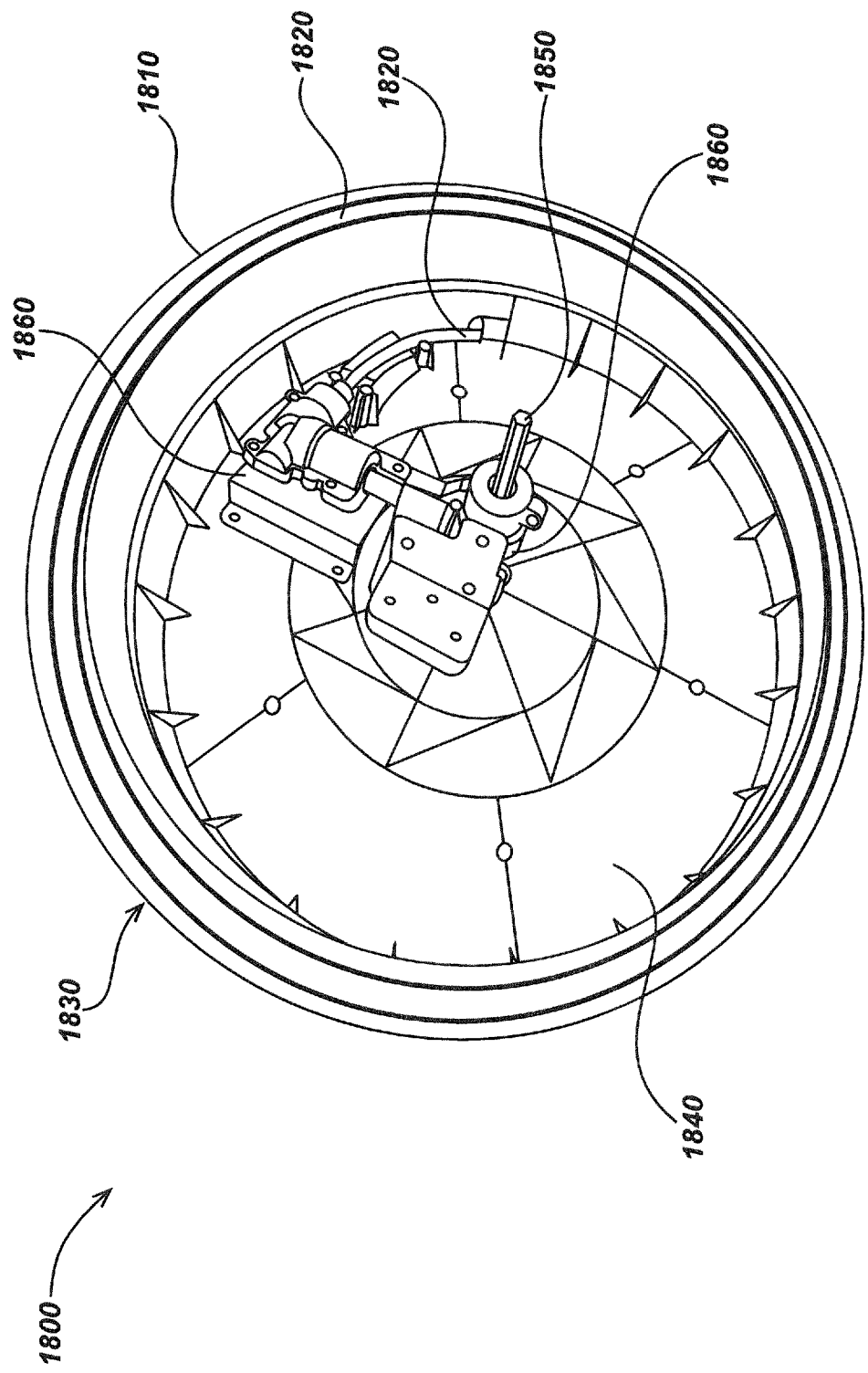
FIG. 18A is an inside view illustration of an embodiment of a flex-shaft drum-reel system, as known in the prior art.

FIG. 18A is an inside view illustration of an embodiment 1800 of a flex-shaft drum-reel system, as known in the prior art. A drum-reel case 1810 is configured for storing and deploying a flex-shaft cable 1820. Typically, the flex-shaft cable 1820 is wound and stored inside the drum case 1810 in a single layer on the outer most layer 1830, therefore, there is a large amount of empty space 1840 available within the flex-shaft drum-reel case. A drive shaft 1850 is provided for supplying rotational power to the flex-shaft cable 1820 via an external device (not shown). As an example, power to the drive shaft 1850 can be provided by a motor, for instance a hand-held motorized drill (FIG. 23A). The drive shaft 1850 is typically centered in the middle of the drum-reel case 1820 and transfers power to the flex-shaft cable 1820 via one or more gears 1860.

FIGS. 18B and 18C are illustrations of embodiments of a dual camera drum system, wherein a flex-shaft drum-reel case 1810 is configured to allow a camera drum-reel 1740 to be docked in the center of the flex-shaft drum-reel case 1810, as shown in FIG. 18C. In this embodiment, the drum-reel case is configured with a partially open middle section, cavity 1840, thereby, allowing the camera drum-reel 1740 to be docked inside cavity 1840 of the drum-reel case 1810 as shown in FIG. 18C. The flex-shaft drum-reel case 1810 and the camera drum-reel 1740 may each have a handle 1890 and 1730, respectively. The handles may be of a single construction, or hinged to allow the handle to fold down, and they may be detachable. The shape of cavity 1840 will be of a similar shape of the outside of the camera-drum-reel, including any external parts such as the handle 1730, thereby allowing the camera drum-reel 1740 to fit snuggly inside the flex-shaft drum-reel case 1810, as shown in FIG. 18C. The flex-shaft drum-reel-case may be configured with one or more stabilizing feet 1890 which allow the drum-reel case to be positioned upright. In some configurations, the camera drum-reel case 1740 may also include one or more stabilizing feet (not shown). If the camera drum-reel 1740 is configured with stabilizing feet or other external components, the shape of the cavity 1840 of the drum-reel case 1810 would be of a similar shape to the outside shape of the drum-reel case 1810 including any stabilizing feet or and/or any other external components. In some embodiments, the front of the camera drum-reel 1740 may be positioned flush, protruding, or recessed relative to the front of the flex-shaft drum-reel case 1810 when in a docked position.

FIG. 19A is an inside view illustration of an embodiment 1900 of a single drum-reel case 1810 configured with a flex-shaft cable 1820 on the outside section of the drum-reel case 1810. The drum-reel case 1810 is shown with the front door 1910 open, showing an integrated camera drum-reel 1740 inside the flex-shaft drum-reel case 1810. Although the door may include a hinge 1920, in this embodiment the camera drum-reel is configured to remain inside of the flex-shaft drum-reel case 1810, but may be removed for replacement or maintenance by opening the door 1910. The door 1910 may be configured with various shapes, dimensions and materials. For instance, in some embodiments the inside of the door 1910 may shaped to be straight or it may be shaped for a portion of the docked camera drum-reel 1740 to fit into the door 1910. In some embodiments, the door 1910 may be solid and in other embodiments it may be translucent or be configured with a window.

One or more handles 1880 may be provided for carrying both the flex-shaft drum-reel case 1810 and the camera drum-reel 1740 at the same time. It would be understood by one reasonably skilled in the art that the handle 1740 can have many configurations. Although FIGS. 19A and 19B show that the handle splits into two halves when the door is open, the handle 1740 could be of a different configuration, as an example the handle 1740 could be a single piece that does not become two pieces when the door is open.

FIG. 19B is an inside view illustration of an embodiment 1900 of a single drum-reel case 1810 configured with a flex-shaft drum-reel 1810 on the outside which includes an opening case which allows a camera drum-reel 1740 to be docked and stored in the center of the flex-shaft drum-reel case 1810. When door 1910 is open, access to the cavity 1840, FIG. 18C, is provided. A coupling mechanism (not shown) is provided to allow the camera drum-reel 1740 to be detachably coupled to the inside of the drum-reel case 1810. The shape of the cavity 1840 will be of a similar shape of the outside of the camera-drum-reel, including any external parts such as the handle 1730, thereby allowing the camera drum-reel 1740 to fit snuggly inside the flex-shaft drum-reel case 1810, as shown in FIG. 19B. A hinge 1920 may be provided to connect the door 1910 to the drum-reel case 1810. One or more latching mechanisms 1930 may be provided to allow door 1910 to be opened or closed and secured. Flex-shaft cable 1820 is stored and deployed in a single layer on the top inner portion of flex-shaft drum-reel case 1810.

Figure 19C:
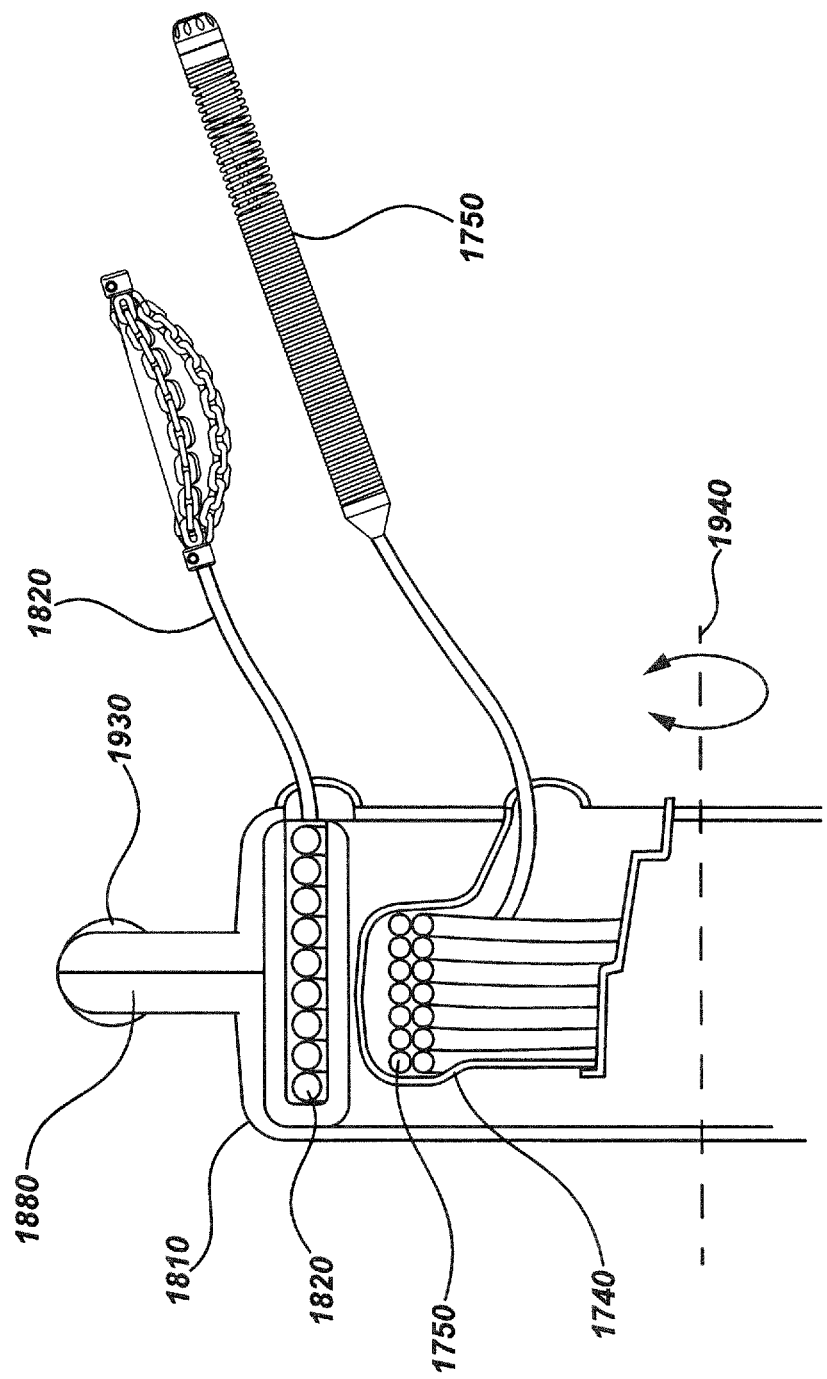
FIG. 19C is a cross-section illustration of an embodiment of FIG. 19B of a camera cable attached to a camera assembly stored on a drum-reel which is configured inside a flex-shaft drum-reel.

FIG. 19C is a cross-section illustration of an embodiment of FIG. 19B of a camera cable 1750 attached to a camera assembly stored on a drum-reel 1740 which is configured inside a flex-shaft drum-reel case 1810. Both drum-reels, camera drum-reel 1740 and flex-shaft drum-reel 1810, are enclosed in single flex-shaft drum-reel case 1810, thereby allowing both drum-reels to be carried and relocated using a single handle 1880. Although the cables and drums are configured to remain inside drum-reel case 1810, a latch 1930 may be provided to allow maintenance access to both drum-reels. As shown, the flex-shaft cable 1820 is stored (wound) in a single layer on the outer most circumference on the inside of drum-reel case 1810. The camera cable 1750 is stored (wound) in multiple layers around the inner camera drum-reel 1740. Both the flex-shaft drum-reel 1810 and the camera drum-reel 1740 rotate around a central axis 1940 when being deployed or retracted. The two drum-reels are configured to work independently of each other. Cable 1820 is stored and deployed from an outer drum-reel that can rotated around a central axis 1940 while not affecting the rotation of a second inner drum-reel which itself can rotate around a central axis 1940 independent of any rotation of the first outer drum-reel, thereby permitting cable camera 1750 and flex-shaft cable 1820 to be deployed together or independently from each other.

FIGS. 20A and 20B are illustrations of embodiments 2000 of a dual camera drum system integrated with at least one battery 2010. In FIG. 20A, camera drum-reel 1740 is configured to be integral with flex-shaft drum-reel 1710. One or more batteries 2010 could be used to power a motor 2320 (FIG. 23), that may be used to power a flex-shaft cable 1720. In another embodiment, one or more batteries 2010 may be used to supply power to a camera attached to a camera cable 1750. In some embodiments, at least two batteries 2010 could be provided to provide redundancy to ensure the camera 1750 can continue to record if one of the batteries fails. Battery 2010 may be fixed or detachable, and may be rechargeable. In some embodiments, one or more batteries 2010 could be configured with various electrical characteristics for powering tools, e.g. an cordless drill, a hand cutting tool, etc.

FIG. 20B is an illustration of an embodiment 2000 of a flex-shaft drum-reel 1710 configured with a dockable camera drum-reel 1750. As shown, camera drum-reel 1750 is detached from flex-shaft drum-reel 1710. Camera 1750 may be powered by one or more batteries 2010 via a cable 2020.

Figure 21B:
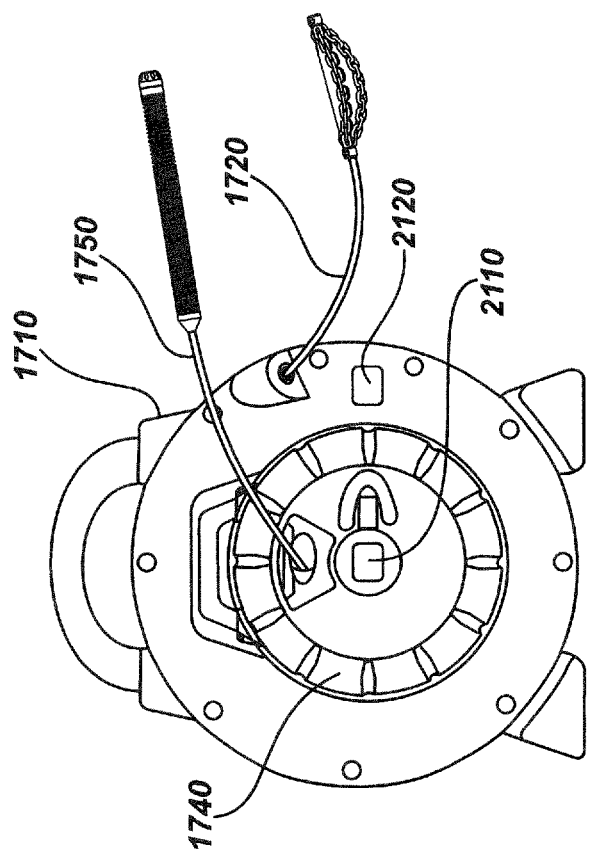
FIGS. 21A and 21B are illustrations of embodiments of a dual camera drum system integrated with at least one reel counter.
Figure 21A:
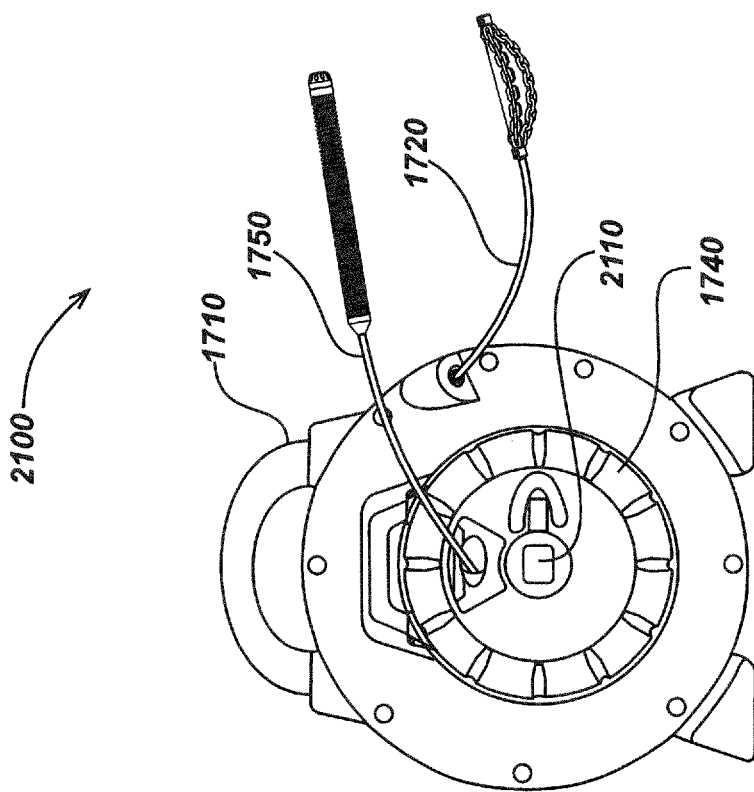

FIGS. 21A and 21B are illustrations of embodiments of a dual camera drum system 2100 integrated with at least one reel counter 2110. Reel counter 2110, shown in both FIGS. 21A and 21B, may be fixed or detachably coupled to camera drum-reel 1740. Reel counter 2110 may be configured to measure the amount of camera cable 1750 deployed or retracted from camera drum-reel 1740. FIG. 21B shows a first reel counter 2110, as well as a second reel counter 2120. Reel counter 2120 may be fixed or detachably coupled configured to measure the amount of flex-shaft cable 1720 deployed or retracted from the flex-shaft drum-reel 1810. The location of the reel counters shown in FIGS. 21A and 21B is an example only. It would be understood by one or ordinary skill in the art that the location of reel counters 2110 and 2120 could be different than shown in the embodiments without changing the intended functionality of the reel counters.

FIGS. 22A and 22B are illustrations of a dual camera drum system 2200 configured with a cable handling device 210. In FIG. 22A, a flex-shaft cable drum-reel 1710 is shown with a camera drum-reel 1740 docked inside. Flex-shaft cable 1720 and camera cable 1750 are shown coupled within cable handling device 210 which is docked to cable drum-reel case 1710 via couplers 2210. The type, quantity, and location of docking/coupling components given is an example only and could be changed based on various design considerations. At least one trigger 420 is provided to allow cable handling device 210 to deploy or retract at least one of the flex-shaft cable 1720 and/or the camera cable 1750 either together or independently. In FIG. 22B, a flex-shaft cable drum-reel 1710 is shown with a camera drum-reel 1740 docked inside. Flex-shaft cable 1720 and camera cable 1750 are shown coupled within cable handling device 210 which is removably fixed to cable drum-reel case 1710 via couplers 2210.

FIG. 22B is an illustration of an embodiment of a dual camera drum system 2200 configured with a built-in cable handling device. At least one trigger 420 is provided to allow cable handling device 210 to deploy or retract at least one of the flex-shaft cable 1720 and/or the camera cable 1750 either together or independently.

FIG. 23A is an illustration of an embodiment of a dual camera system 2300 configured using a typical hand-drill 2310 to provide rotational power to drive shaft 1850 (not shown), to which it is attached. Rotational power from hand-drill 2210 supplied drive shaft 1850 will provide power to flex-shaft cable 1720 for rotating an attached tool, typically a cutting type of tool, via one or more gears (not shown).

FIG. 23B is an illustration of an embodiment of a dual camera system 2300 showing possible drive shaft 1850 locations/configurations. While FIG. 23B shows possible locations/configurations of drive shaft 1850 for supplying rotational power to flex-shaft cable 1720 via one or more gears (not shown), one skilled in the art would appreciate that many other locations/configurations could be used based on design considerations, and could be determined via a minimal amount of experimentation.

FIG. 23C is an illustration of an embodiment of a dual camera system 2300 integrated with a built in motor 2320. In one embodiment, motor 2320 may be provided for supplying rotational power to flex shaft cable 1720 via one or more gears (not shown). Power for motor 2300 may be provided externally internally. In some embodiments, power may be provided by one or more batteries (see FIGS. 20A and 20B).

Figure 24A:
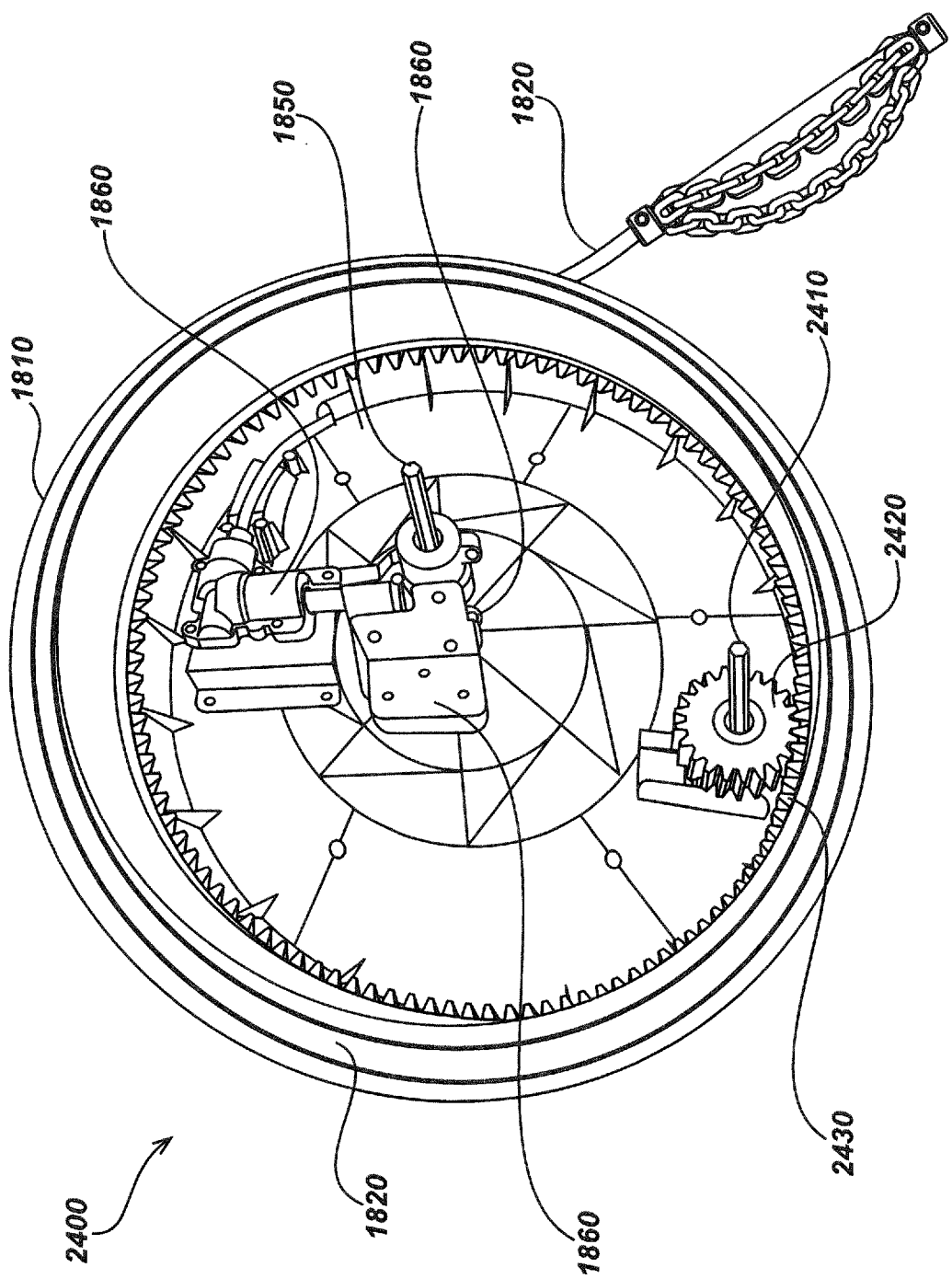
FIGS. 24A and 24B are illustrations of embodiments of a drum-reel for storing and deploying a flex-shaft cable, wherein the drum-reel is configured to allow automatic retraction of the flex-shaft cable via a motorized drill.

FIG. 24A is an inside view illustration of an embodiment 2400 of a flex-shaft drum-reel 1810 for storing and deploying a flex-shaft cable 1820, wherein the flex-shaft drum-reel 1810 is configured to allow automatic retraction or deployment of the flex-shaft cable 1820 via a motor (not shown). In one embodiment, a motorized drill (as shown in FIG. 23A), may be used to supply rotational power to the flex-shaft cable 1820 and any tool attached to the distal end of the flex-shaft-cable, e.g. a cutting tool such as a chain knocker, a blade, or any other type of cutting tool requiring rotational power. The motorized drill (as shown in FIG. 23A) supplies the rotational power by applying the rotating portion of the drill to the drive shaft 1850 of the flex-shaft cable 1820 which in turn supplies rotational power to the flex-shaft cable via gears 1860. The same motorized drill (FIG. 23A) can be used to feed (deploy) the cable or retract the cable back on to the flex-shaft drum-reel 1810 by placing the rotation portion of the motorized drill FIG. 23A on a second drive shaft 2410. When rotational power is supplied to drive shaft 2410, drive shaft 2410 will rotate a first gear 2430 which is meshed with a second gear 2430 which in turn will rotate the flex-shaft drum-reel 1810 in one of two directions thus causing the flex-shaft cable 1820 to be retracted onto the flex-shaft drum-reel 1810 or deployed off of the flex-shaft drum-reel 1810. The direction of rotation of the motorized drill (FIG. 23A) will determine the direction of rotation of the flex-shaft drum-reel, and in turn, whether the flex-shaft cable is wound around the flex-shaft drum-reel 1810 (retracted and stored), or wound off of the flex-shaft drum-reel 1810 (deployed).

Figure 24B:
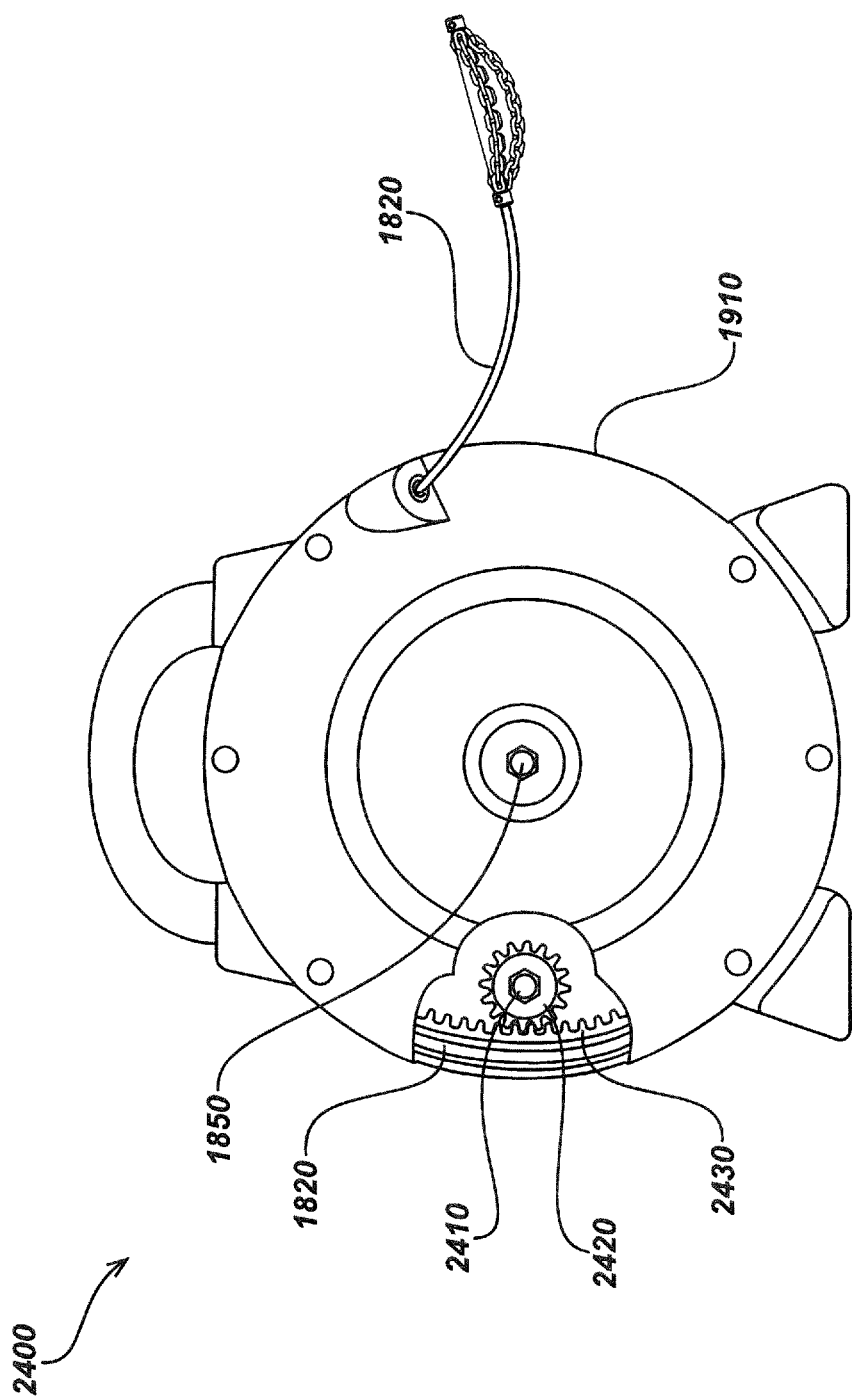

FIG. 24B inside view illustration of an embodiment 2400 of a flex-shaft drum-reel 1810 for storing and deploying a flex-shaft cable 1820. In this view, the door 1910 is shown closed but configured as to allow access to drive shafts 1850 and 2430, respectively. In this exemplary embodiment, the location of drive shafts 1850 and 2430 is an example only. It would be understood by those of ordinary skill in the art that the drive shafts could be located in other areas on the flex-shaft drum-reel case 1810 and there may be any number of gear configurations (numbers, placement, etc.), that differ from those shown as 1860, 2420 and 2430.

The scope of the invention is not intended to be limited to the aspects shown herein but are to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the disclosures herein and in the appended drawings.

We claim:

1. A cable handling system, comprising:
a cable handling device for inspection of pipes or cavities, comprising:
a housing for at least partially enclosing one or more cables or hoses, wherein the housing includes a first end enclosure opening and a second end enclosure opening, wherein both the first and second end enclosure openings allow the one or more cables or hoses to be deployed through substantially opposite ends of the housing;
a first motorized cable or hose feed element;
a second motorized cable or hose feed element;
at least one coupler for coupling and decoupling the one or more cables or hoses to the first motorized cable or hose feed element and/or the second motorized cable or hose feed element; and
a switch for controlling at least one of the first motorized cable or hose feed element and/or the second motorized cable or hose feed element, wherein the switch is configured to control a forward feeding direction or a backward feeding direction of the one or more cables or hoses via the first motorized cable or hose feed element and/or the second motorized cable or hose feed element.

2. The cable handling system of claim 1, wherein the switch comprises a left rocker switch and a right rocker switch, wherein the left rocker switch and the right rocker switch are positioned adjacent;
wherein both the left rocker switch and the right rocker switch have a neutral position, a forward position, and a backward position for feeding at least one of a first cable and a second cable in a forward direction or a backward direction, and wherein when both the left rocker switch and the right rocker switch are in the forward position, both the first cable and second cable will be fed forward, and wherein when the left rocker switch and the right rocker switch are in the backward position, both the first cable and the second cable will be fed in the backward direction.

3. The cable handling system of claim 2, wherein the left rocker switch and the right rocker switch are configured to activate one or more sensors when the switches are placed in the forward or backward direction.

4. The cable handling system of claim 3, wherein the one or more sensors are pressure sensors.

5. The cable handling system of claim 3, wherein the one or more sensors are magnetic sensors.

6. The cable handling system of claim 1, wherein the switch comprises a rocker switch, wherein the rocker switch comprises seven positions, wherein one of the seven positions is a neutral position, and one of the other six positions allows a single cable or hose of the one or more cables or hoses to be fed forward, a single cable or hose of the one or more cables or hoses to be fed backward, two of the one or more cables or hoses to be fed forwards simultaneously or two of the one or more cables or hoses to be fed backwards simultaneously.

7. The cable handling system of claim 6, wherein the seven positions of the rocker switch comprise:
a neutral position;
a forward-left position for feeding a first cable or hose of the one or more cables or hoses in a forward direction;
a backward-left position for feeding the first cable or hose in a backward direction;
a forward-right position for feeding a second cable or hose of the one or more cables or hoses in the forward direction;
a forward position for feeding both the first cable or hose and the second cable or hose in a forward direction simultaneously; and
a backward position for feeding both the first cable or hose and the second cable or hose in a backward direction simultaneously.

8. The cable handling system of claim 7, wherein the one or more sensors are pressure sensors.

9. The cable handling system of claim 7, wherein the one or more sensors are magnetic sensors.

10. The cable handling system of claim 6, wherein six positions of the switch each activate one or more sensors.

11. The cable handling system of claim 1, further comprising a first cable or hose, and a second cable or hose.

12. The cable handling system of claim 11, wherein the first cable or hose is a flex-shaft cable configured to transmit rotational power to a cutting tool, and the second cable or hose is a camera cable attached to a camera assembly.

13. The cable handling system of claim 11, wherein the first cable or hose is a camera cable attached to a camera assembly, and the second cable or hose is a flex-shaft cable configured to transmit rotational power to a cutting tool.

14. The cable handling system of claim 11, wherein the first cable or hose is a flex-shaft cable configured to transmit rotational power to a cutting tool, and the second cable or hose is a jetter hose comprising a central channel configured for transmitting fluid under pressure through the jetter hose to a jetter nozzle.

15. The cable handling system of claim 11, wherein the first cable or hose is a jetter hose comprising a central channel configured for transmitting fluid under pressure through the jetter hose to a jetter nozzle, and the second cable or hose is a flex-shaft cable configured to transmit rotational power to a cutting tool.

16. The cable handling system of claim 11, further comprising a first drum-reel for storing and deploying the first cable or hose, and a second drum-reel configured for storing and deploying the second cable or hose.

* * * * *